United States Patent
Rasmussen et al.

(10) Patent No.: US 9,266,668 B2
(45) Date of Patent: Feb. 23, 2016

(54) BEVERAGE, A BEVERAGE CONTAINER INCLUDING A BEVERAGE, A METHOD OF PRODUCING A BEVERAGE AND A BEVERAGE PRODUCTION PLANT

(75) Inventors: Jan Norager Rasmussen, Olstykke (DK); Steen Vesborg, Gentofte (DK)

(73) Assignee: Carlsberg Breweries A/S, Copenhagen V (DK)

( * ) Notice: Subject to any disclaimer, the term of this patent is extended or adjusted under 35 U.S.C. 154(b) by 0 days.

(21) Appl. No.: 14/122,010

(22) PCT Filed: May 25, 2012

(86) PCT No.: PCT/EP2012/059873
§ 371 (c)(1),
(2), (4) Date: Feb. 11, 2014

(87) PCT Pub. No.: WO2012/160198
PCT Pub. Date: Nov. 29, 2012

(65) Prior Publication Data
US 2014/0147558 A1    May 29, 2014

(30) Foreign Application Priority Data
May 26, 2011 (EP) .................................. 11167630

(51) Int. Cl.
*B65D 85/73* (2006.01)
*A23L 2/54* (2006.01)
(Continued)

(52) U.S. Cl.
CPC . *B65D 85/73* (2013.01); *A23L 2/54* (2013.01); *B65D 77/0486* (2013.01); *B65D 81/2053* (2013.01); *C12C 11/11* (2013.01)

(58) Field of Classification Search
CPC ............ B01F 2003/04843; B01F 2003/04851; B01F 2003/04858; B01F 2003/04893; B01F 2003/049; B01F 3/04787; B01F 3/04794; B01F 3/04801; B01F 3/04808; B01F 3/04815; B01F 3/04099; B01F 3/04106; B01F 3/04439; B01F 3/04446; B01F 3/0446; B01F 3/04468; B01F 3/04475; B01F 3/04482; B01F 3/04489; B01F 3/04496; B01F 3/04539; B01F 3/04588; B01F 3/04595

USPC ............. 426/7, 8, 11, 67, 474, 477, 590, 569, 426/564
See application file for complete search history.

(56) References Cited

U.S. PATENT DOCUMENTS

| 4,921,135 A | 5/1990 | Pleet |
| 6,209,344 B1 | 4/2001 | Mahajan |

(Continued)

FOREIGN PATENT DOCUMENTS

| EP | 0285225 | 10/1988 |
| EP | 1213258 | 6/2002 |

(Continued)

OTHER PUBLICATIONS

International Search Report on corresponding PCT application (PCT/EP2012/059873) from International Searching Authority (EPO) dated Jul. 27, 2012.

*Primary Examiner* — Drew Becker
*Assistant Examiner* — Bryan Kim
(74) *Attorney, Agent, or Firm* — Klein, O'Neill & Singh, LLP

(57) ABSTRACT

The present invention relates to a beverage including dissolved and partially dissociated carbon dioxide present in an amount of 2-10 g/liter, such as 3-8 g/liter, preferably 4-6 g/liter, most preferably about 5.5 g/liter and establishing an equilibrium pressure at 10° C. of 0.5-3 bar above atmospheric pressure, such as 1-2 bar, preferably about 1.5 bar. The present inventions further relates to a water insoluble or hydrophobic constituent present in molecular form or in molecular aggregated form and in an amount capable of generating ultra fine bubbles including gaseous carbon dioxide. The ultra fine bubbles are present in an amount exceeding $10^{10}$ ultra fine bubbles per milliliter, such as $10^{12}$-$10^{18}$ ultra fine bubbles per milliliter, preferably $10^{15}$-$10^{17}$ ultra fine bubbles per milliliter, most preferably about $10^{16}$ ultra fine bubbles per milliliter, when the beverage is exposed to an external isostatic pressure exceeding the equilibrium pressure of the beverage by at least 1.0 bar, preferably 1.2-60 bar, more preferably 1.5-10 bar, most preferably about 2 bar, the ultra fine bubbles having a major dimension smaller than 100 nm, such as 20-60 nm, preferably about 40 nm.

12 Claims, 19 Drawing Sheets

(51) Int. Cl.
  *B65D 81/20* (2006.01)
  *C12C 11/11* (2006.01)
  *B65D 77/04* (2006.01)

(56) References Cited

U.S. PATENT DOCUMENTS

| | | | |
|---|---|---|---|
| 6,209,855 B1 | 4/2001 | Glassford | |
| 6,344,489 B1* | 2/2002 | Spears | 516/10 |
| 2005/0268985 A1* | 12/2005 | Litto | 141/67 |
| 2010/0243596 A1 | 9/2010 | Van Hove et al. | |

FOREIGN PATENT DOCUMENTS

| | | | |
|---|---|---|---|
| EP | 2014432 | 1/2009 | |
| EP | 2080709 | 7/2009 | |
| EP | 2463022 A1 * | 6/2012 | B01J 13/00 |
| GB | 2284589 | 6/1995 | |
| JP | 2008296995 | 12/2008 | |
| WO | WO99/11561 | 3/1999 | |
| WO | WO01/92142 | 12/2001 | |
| WO | WO01/92145 | 12/2001 | |
| WO | WO2007/105933 | 9/2007 | |
| WO | WO 2007105933 A1 * | 9/2007 | B65D 75/62 |
| WO | WO2008/000271 | 1/2008 | |
| WO | WO2008/087206 | 7/2008 | |
| WO | WO2008/129012 | 10/2008 | |
| WO | WO2008/129015 | 10/2008 | |
| WO | WO2008/129018 | 10/2008 | |
| WO | WO2009/071085 | 6/2009 | |
| WO | WO2009/086830 | 7/2009 | |
| WO | WO2010/119056 | 10/2010 | |
| WO | WO2011/002293 | 1/2011 | |

* cited by examiner

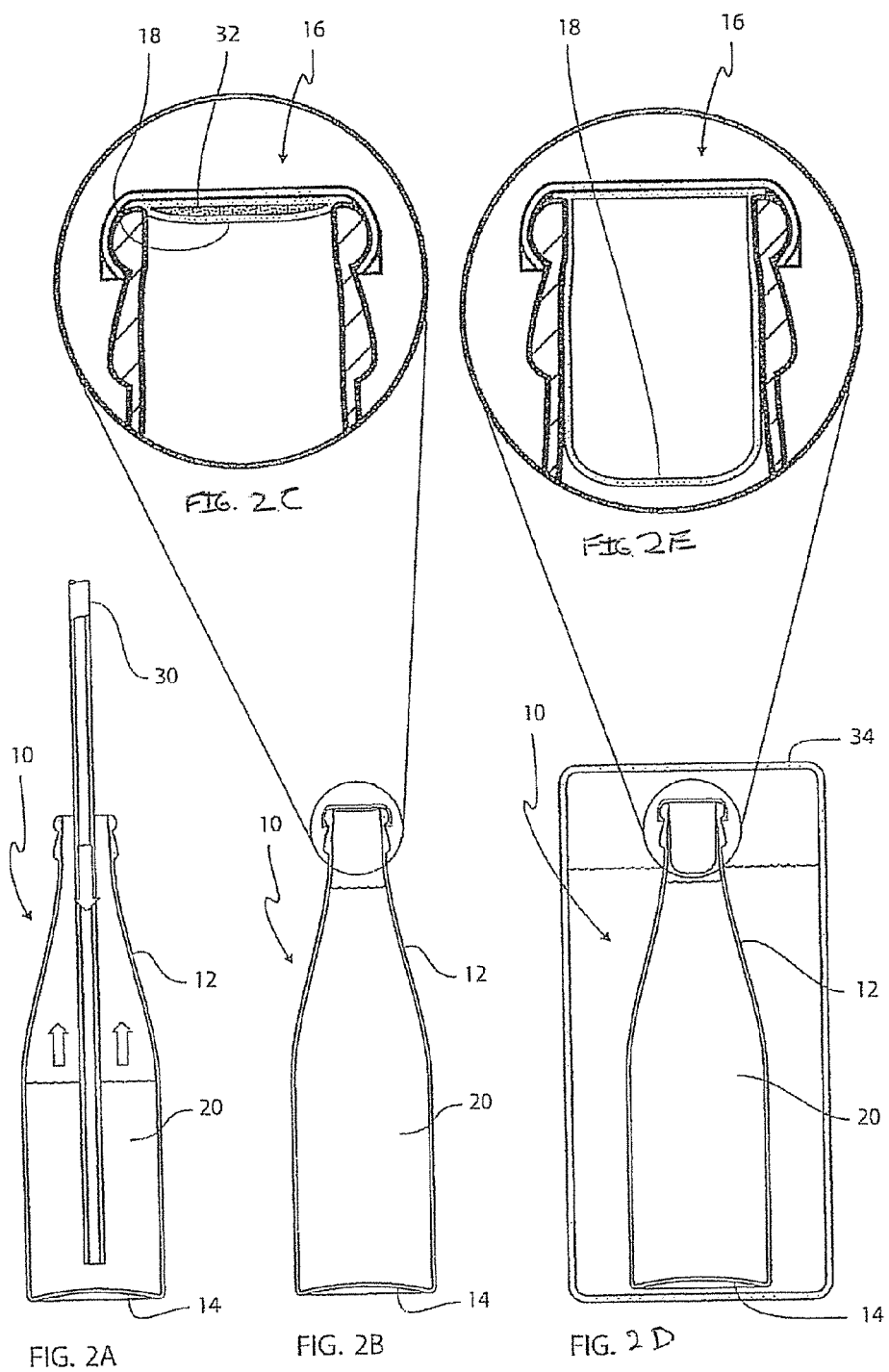

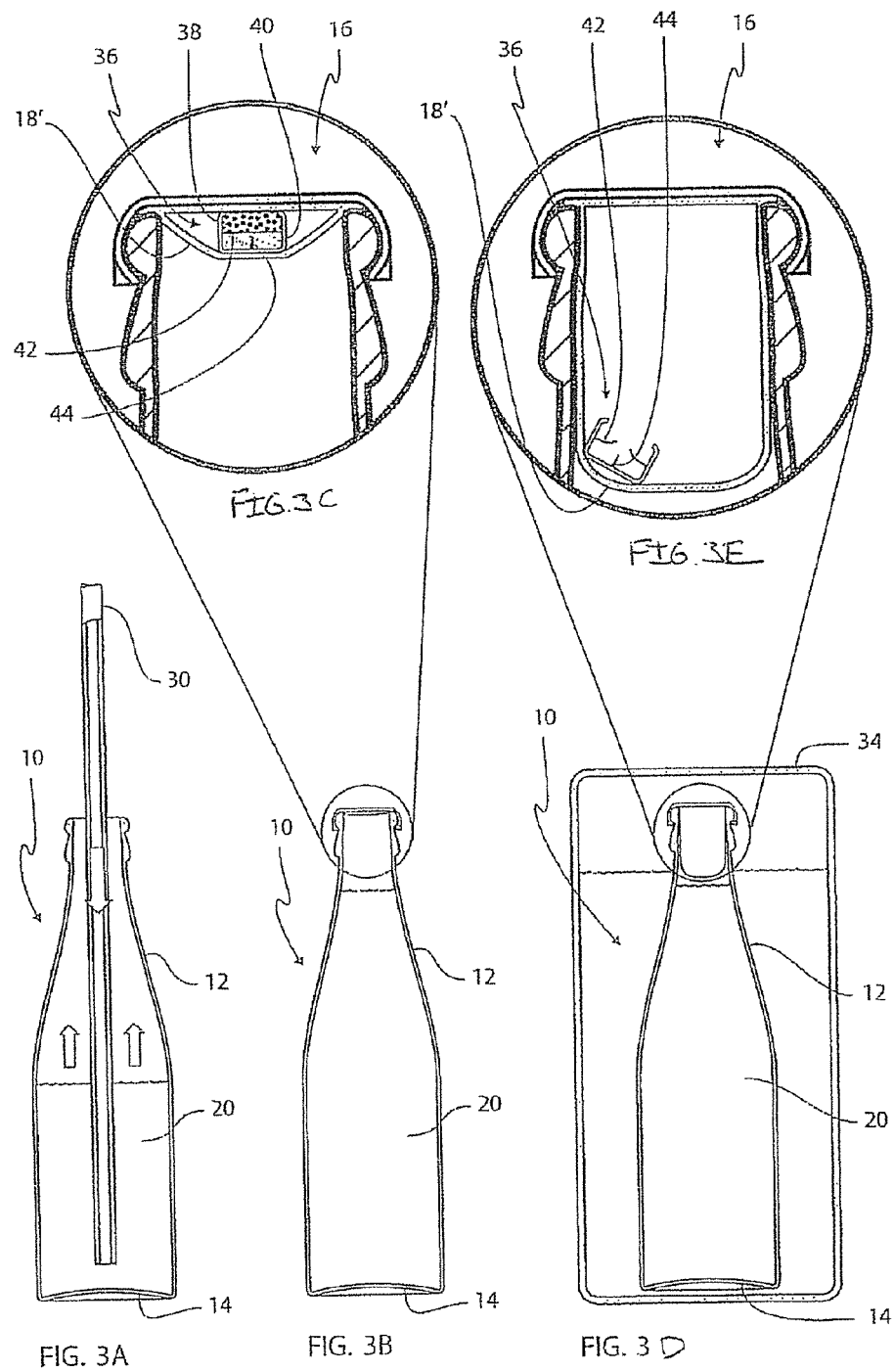

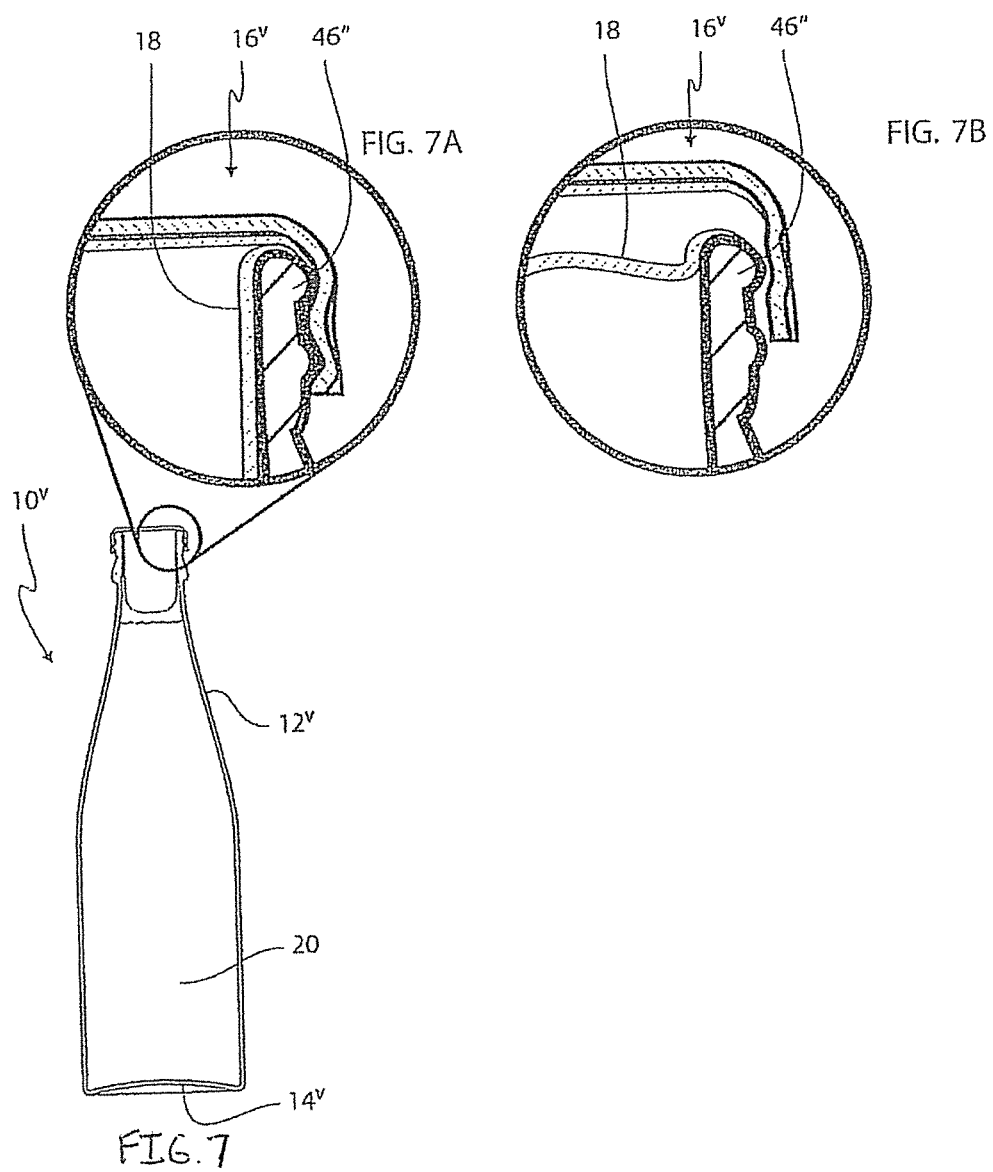

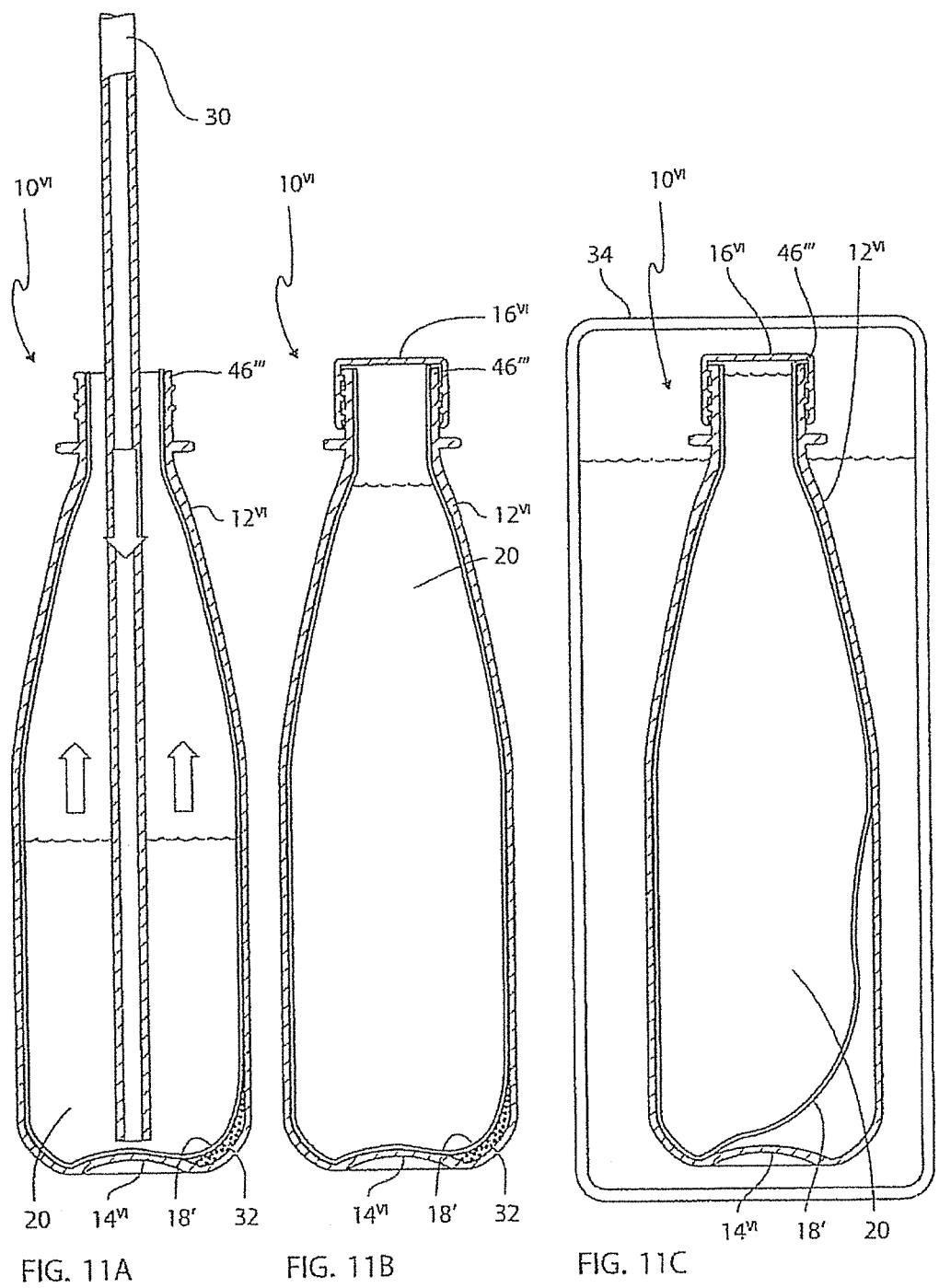

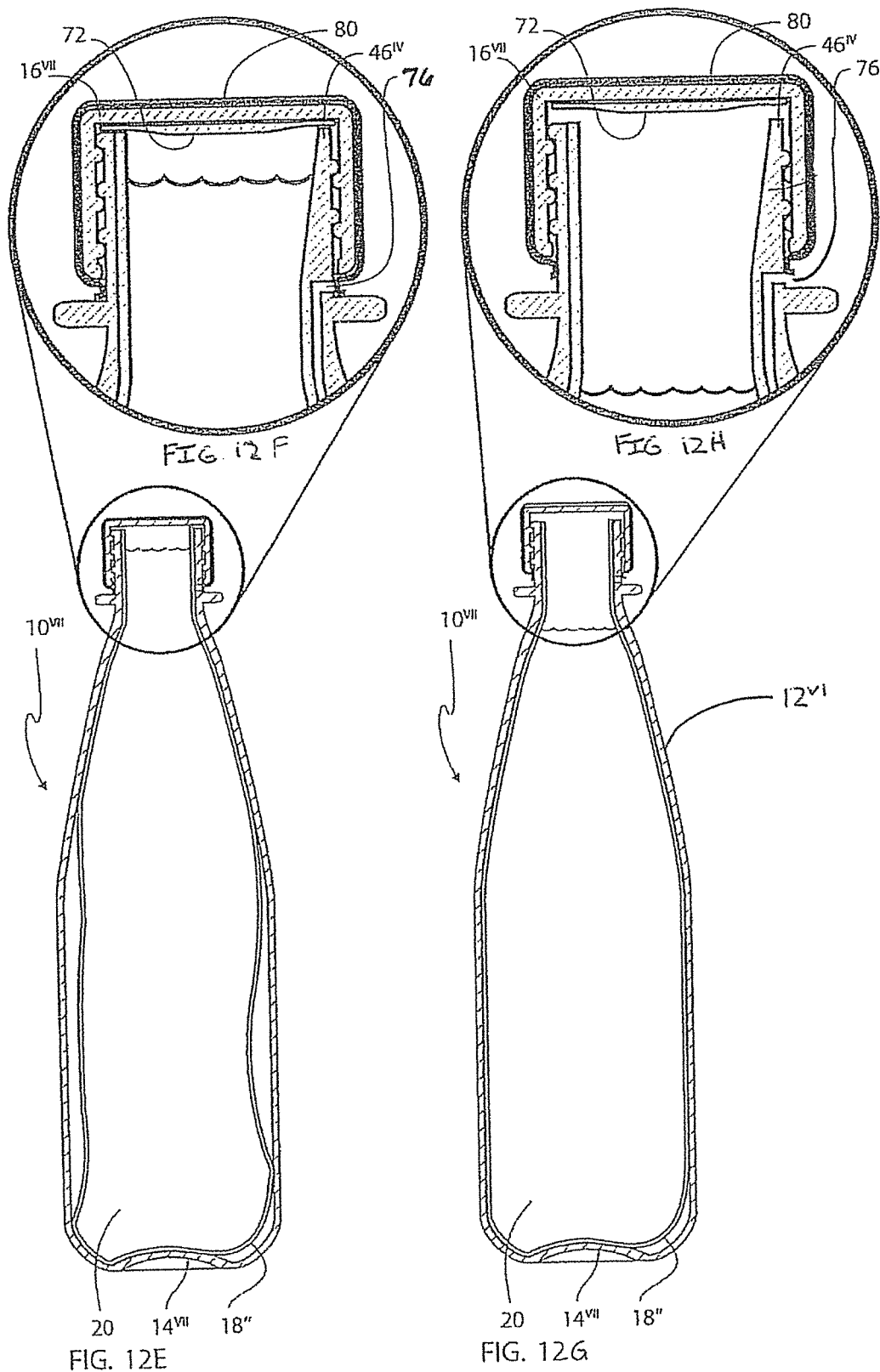

BEVERAGE, A BEVERAGE CONTAINER INCLUDING A BEVERAGE, A METHOD OF PRODUCING A BEVERAGE AND A BEVERAGE PRODUCTION PLANT

CROSS-REFERENCE TO RELATED APPLICATION

This application is a national phase filing, under 35 U.S.C. §371(c), of International Application No. PCT/EP2012/059873, filed on May 25, 2012, the disclosure of which is hereby incorporated by reference in its entirety.

FEDERALLY SPONSORED RESEARCH OR DEVELOPMENT

Not Applicable

BACKGROUND

The present invention relates to a beverage, a beverage container including a beverage, a method of producing a beverage and a beverage production plant.

Producers of carbonated beverage, in particular breweries, constantly seek to improve the flavour of their beverage. It is well known that humans perceive the flavour of e.g. beverage via taste buds located on the tongue. Thus, in order to alter the flavour of the beverage, the chemical composition of the beverage may be changed in order to influence the taste buds differently. Other ways of changing the taste of the beverage not involving changing the chemical composition of the beverage include modifying the temperature at which the beverage is served. Carbonated beverages are generally served cool, at about 10° C. At lower temperatures, the taste buds are generally less sensitive to flavours whereas at higher temperatures, carbonated beverages do generally appear less "fresh". The "freshness" of the beverage may also be increased by increasing the carbonization of the beverage and thus making the beverage slightly prickling on the tongue of the drinker, however, beyond a certain carbonization level the taste of the beverage will be negatively influenced by the large amount of bubbles in the beverage causing a strong prickling effect on the tongue of the drinker and by the sour taste of the carbon acid generated. It is of course contemplated that there are no strict rules when discussing the taste of a beverage, since the taste experience may vary significantly between individual beverage drinkers.

In experiments it has been observed that when certain beverages are submitted to isothermal compression then, contrary to the general expectation of the incompressibility of watery phases, a compressibility of about 0.1% per bar can be measured. It has also been observed that when certain beverages are submitted to an abrupt deceleration, such as can happen when the beverage container is accidentally dropped to the floor, a sudden pressure jump of about 2 bar can be measured inside the container, after which a slow reversal to the initial lower pressure conditions can be observed at a rate approximating 1 mbar/min. In both of the above situations it was observed that the beverages at all times remained clear and void of opaque components during the above experiments.

It is contemplated that the above experimental findings can be rationalized according to the following model, wherein the presence of $CO_2$-filled ultra fine bubbles within the observed beverages which have sizes below the Abbe-diffraction limit of about 80 nm and are present in equilibrium with dissolved and partially dissociated $CO_2$ is proposed. Such ultra fine bubbles would be compressible, non-visible and have access to the surplus of $CO_2$-gas necessary to undergo the observed abrupt pressure increase when abruptly decelerated. Usually, as such ultra fine bubbles are not expected to be stable as their sizes are below the LaPlace-limit given by $P=2*\gamma/r$, wherein P is the pressure inside the bubbles, $\gamma$ the surface tension of the beverage and r the radius of the bubble, it is further contemplated that amphiphilic components in the beverages such as fatty acids and the like could contribute to lowering the surface tension to such levels that the presence of the proposed ultra fine $CO_2$-bubbles in the examined beverages can exist through either thermodynamical or kinetical stabilization. Potentially, such an amphiphilic layer could contribute to an additional dissolution of $CO_2$ within the amphiphilic layer, further serving as a reservoir for $CO_2$ within the beverage.

Calculations based on the above reported experimental results have shown that the number of bubbles in one liter of beverage prepared according to the invention can be as high as $10^{15}$ to $10^{21}$ bubbles per liter of beverage, which corresponds to molar concentrations ranging from about 0.1 ppb and up to about 100 ppm. It is contemplated without otherwise considering the below presented model restrictive for the contents of the invention, that the stability of the bubbles created inside the beverages examined can be rationalized by one or several thermodynamical models of bubble-nucleation. E.g. in one such model, commonly classified as a self-consistent theory of nucleation (see e.g. S. L. Girshick, C.-P. Chiu, J. Chem. Phys., 93(2), pp 1273-1277, 1990), it is proposed that stable nucleation cores, such as i.e. micro-bubbles, may exist within homogeneous and heterogeneous phases, such as the watery phase of the beverages examined, when the surface tension of the nucleation cores is balanced by the degree of supersaturation up to a limiting concentration of nucleation cores whereupon macroscopic nuclei are observed such as e.g. visible carbon dioxide bubbles in carbonated beverages.

In beverages prepared according to the present invention, supersaturation of the carbon dioxide pressure is achieved by applying additional pressure to the beverages, thereby substantially reducing or even eliminating any development of headspace above the beverages prepared according to the present invention. The relatively high pressures used to achieve this effect surprisingly cause less bubbles to form when the beverages prepared according to the present invention are poured, which permits a stronger carbonization desirable in e.g. beers of various varieties while maintaining or surprisingly even enhancing the effervescent effect of carbon dioxide upon drinking through an observed faster release of macroscopic bubbles.

Surprisingly and most importantly, it has now been realized by the inventors that the isostatic compression of some kinds of beer and other $CO_2$-containing beverages (such as e.g. soft drinks) fulfilling certain specific requirements that were already at equilibrium pressure with a gaseous $CO_2$-phase external to the aqueous phase (a headspace), upon compression to the above described super-equilibrium pressure (whereby the headspace is substantially reduced or even eliminated) has a profound influence on the taste, which becomes sweeter, milder and less prickling on the tongue. Further beverages prepared according to the present invention have been found to be acceptable to drink at higher temperatures compared to their regular counterparts, consequently allowing the beverages prepared according to the present invention to be served at increased temperatures as compared to their regular counterparts. This represents another advantage of the beverages prepared according to the present invention as the cooling of beverages to palatable pleasant temperatures constitutes a major economic and environmental limitation within the beverages industry.

The generation of the bubbles in carbonated beverages and other liquids has been the subject of intense research. Some prior art documents relating to carbonated beverages and similar liquids, as well as containers for holding such beverages and liquids, are presented below:

In the scientific paper titled "Superstability of Surface Nanobubbles" of the "Physical review letters" of the American Physical Society dated 18 May 2007, it has been revealed that nanobubbles are stable for hours even when reducing the water pressure.

The scientific paper titled "Surface Tension Module" by John W. M. Bush of the Department of Mathematics, MIT, teaches that the pressure within the bubble is higher than that outside by an amount proportional to the surface tension, and inversely proportional to the bubble size.

In the scientific paper titled "Bubble population phenomena in acoustic cavitation" by T. G. Leighton, Ultrasonics Sonochemistry 1995 Vol 2 No 2, it is suggested that the size of the bubble and the nature of the local sound field determine whether the bubble oscillations are spherical or non-spherical.

In the scientific paper "$CO_2$—Hydrophobin structures acting as nanobombs in beer", published in Monatsschrift für Brauwissenschaft vol: 63 issue: ¾ pages: 54-61, it is suggested that the hydrophobins' association to $CO_2$ nanobubbles is acting as "nanobombs" and perhaps as "nucleation sites" causing overfoaming of the carbonated beverage.

In the book titled "The Acoustic Bubble" of T. G. Leighton, Institute of Sound and Vibration Research, The University of Southampton, UK, published by Academic Press Limited, it is suggested that organic impurities such as fatty acids may accumulate on the wall of a bubble. In this manner, a bubble nucleus would be stabilized against dissolution.

WO 2009/071085 of the applicant company discloses an adapter set for use in combination with a collapsible beverage container and a beverage dispensing system. The beverage dispensing system includes an inner chamber, a pressurizing device and a cooling device.

EP 2014432 and EP 2242636 disclose a multi container comprising an inner stretch blow moulded part being loosely positioned within an outer stretch blow moulded part. Further documents disclosing various multi containers or bag-in-kegs include U.S. Pat. No. 6,209,344, US 2010/0243596, WO 2011/002293, WO 2008/129012, WO 2008/129015, WO 2008/129018 and WO 2008/087206.

EP 2080709 discloses an assembly of a container and a closure. The closure comprises two access ports.

WO 2010/119056 of the applicant company discloses a self regulating and constant pressure maintaining product dispenser. The dispenser is inherently capable of substantially maintaining the initial pressure in the pressure space by releasing or adsorbing propellant gas.

WO 2008/000271 discloses the use of insoluble gas in beverage to provide a more pleasant and smooth mouth feeling experience perceived by the drinker.

U.S. Pat. No. 6,209,855 discloses a method for mixing discrete microscopic portions of gas in a liquid.

SUMMARY OF THE INVENTION

The object of the present invention is therefore to improve the taste of a carbonated beverage without requiring a significant changing of the chemical composition of the carbonated beverage.

It is an advantage according to the present invention that the beverage having an improved taste may be enjoyed at a relatively higher temperature and/or may include less $CO_2$ while retaining an acceptable taste of the carbonated beverage. Thus, refrigerators holding the carbonated beverage according to the present invention will have a lower power consumption compared to conventional refrigerators and consequently results in less energy needed to operate refrigerators and less $CO_2$ will be emitted into the environment.

Further features according to the present invention include the provision of systems and methods for improving the taste of a carbonated beverage and containers for holding a carbonated beverage according to the present invention.

The above object, the above features and the above advantage together with numerous other objects, advantages and features, which will be evident from the below detailed description of the present invention, are according to a first aspect of the present invention obtained by a beverage including:

dissolved and partially dissociated carbon dioxide present in an amount of 2-10 g/liter, such as 3-8 g/liter, preferably 4-6 g/liter, most preferably about 5.5 g/liter and establishing an equilibrium pressure at 10° C. of 0.5-3 bar above atmospheric pressure, such as 1-2 bar, preferably about 1.5 bar, and a water insoluble or hydrophobic constituent present in molecular form or in molecular aggregated form and in an amount capable of generating ultra fine bubbles including gaseous carbon dioxide, the ultra fine bubbles being present in an amount exceeding $10^{10}$ ultra fine bubbles per milliliter, such as $10^{12}$-$10^{18}$ ultra fine bubbles per milliliter, preferably $10^{15}$-$10^{17}$ ultra fine bubbles per milliliter, most preferably about $10^{16}$ ultra fine bubbles per milliliter, when the beverage is exposed to an external isostatic pressure exceeding the equilibrium pressure of the beverage by at least 1.0 bar, preferably 1.2-60 bar, more preferably 1.5-10 bar, most preferably about 2 bar, the ultra fine bubbles having a major dimension smaller than 100 nm, such as 20-60 nm, preferably about 40 nm.

The beverage according to the first aspect is in the state before the ultra fine bubbles have been generated as will be discussed below. The beverage may be e.g. beer or cola or any other beverage including a water insoluble or hydrophobic constituent. The amount of dissolved and partially dissociated carbon dioxide is an amount which is typical for most carbonated beverage and which is generally accepted as enhancing the flavor of the beverage to a substantial degree while preventing a too strong prickling effect on the tongue of the drinker. The equilibrium pressure is known to be temperature dependent, thus, in the present context, the equilibrium pressure is defined at 10° C., which is the typical serving temperature for most carbonated beverages. Atmospheric pressure is in the present context considered to correspond to 1 ATM. The equilibrium pressure is governed by Henry's law which states that at a constant temperature, the amount of a given gas that dissolves in a given type and volume of liquid is directly proportional to the partial pressure of that gas in equilibrium with that liquid. At equilibrium, the amount of $CO_2$ dissolved in the beverage is equal to the amount of $CO_2$ released from the beverage. When the pressure surrounding the beverage sinks, e.g. by opening a sealed beverage container, the beverage will start releasing more $CO_2$ than is being dissolved. On the contrary, when the pressure in the head space is increased, e.g. by increasing the amount of gas in the head space without increasing the volume of the head space, $CO_2$ will be dissolved in the beverage until a new equilibrium pressure is achieved.

A short theoretical explanation of the scientific work leading to the present invention will now follow together with the inventors' current views of the physical effects involved, however, the theoretical explanations must not in any way be construed as limiting the present invention to these explanations.

According to the LaPlace bubble theory, the pressure is derived according to the equation $P=(2*G)/r$, wherein P is the pressure in the bubble, G being gamma is the surface tension of the beverage and r is the radius of the bubble. Below a certain radius, the surface tension will pull the bubble to be even smaller and finally the bubble will disappear. The limit for beer is about $r=0.1$ um (100 nm) or less. In case the radius is smaller, the bubble will collapse and disappear. However, the inventors have found out that there is still some amount of elasticity in the beverage. $dV/dP$ at constant T is around 0.001/bar or 0.1% per bar. The elasticity may be explained by bubbles still remaining in the beer, despite the LaPlace collapse.

Beer is not a pure solution or a pure liquid but contains insoluble species such as fatty acids and possibly insoluble proteins. The insoluble species are hydrophobic and tend to form aggregates with themselves (micelles). Given the opportunity, the hydrophobic molecules tend to reside in a thermodynamically favourable surface layer in which the molecule can orient itself so that most of the molecule will be located within the bubble and not adjacent the liquid.

The pH in beer is around 4.3, so the hydrophobic species, (fatty acids) are in the form of fully protonated acids, i.e. fully hydrophobic. They will at a certain pressure form a monolayer, which will not allow the bubble wall to be compressed further. A bubble thus stabilised will not collapse to zero. At a certain higher pressure the hydrophobic species may form a double layer, creating a new higher pressure plateau. Now a third layer of hydrophobic species may form and so on. The bubble itself comprises $CO_2$ and some water vapour. $CO_2$ is a linear symmetric stiff non-polar neutral molecule which can mingle in between the fatty acids in the wall.

The inventors have surprisingly found out that beer and some other carbonated beverages contain 3 "kinds" or guises of $CO_2$, the first "kind" or guise of $CO_2$ being the above described, dissolved and partially dissociated $CO_2$ in accordance with Henry's law, the second "kind" or guise of $CO_2$ being the more complex physical dispersion of bubbles elucidated above, representing the ordinary gas inside the bubble which is responsible for the elasticity and the third "kind" or guise of $CO_2$ being the much more densely packed $CO_2$ in the bubble wall.

The $CO_2$ in the bubble wall may very rapidly (fraction of a microsecond) migrate into the $CO_2$ gas inside the bubble. An "instantaneous" pressure increase of about 2 bar may be observed when dropping a PET bottle containing beer from one meter onto a concrete floor. Still, even so, the bubbles are invisible, i.e. there is no visible diffraction of even violet visible light, indicating that the bubble size must be less than the Abbe limit. The Abbe limit stipulates that the limits of visible light which may be observed by a microscope is ¼ of the wavelength of the light. The human eye can only see the octave from 400 to 800 nm, thus the Abbe limit for humans is 100 nm.

Thus the size of the bubbles before the expansion (the drop) must be smaller than 50 nm, such as smaller than 40 nm and most likely about 10 nm in diameter. This implies that beer may, at least theoretically, contain 10E21 bubbles per liter.

According to the realization, in case the beer is compressed, the size of the bubbles will be reduced, such as from aforementioned 50 nm or 10 nm to something like 25 nm or 5 nm. The inventors have surprisingly found out that applying an isostatic compression of beer, which already was at equilibrium pressure, thereby achieving a super equilibrium pressure, results in a profound influence on the taste. The taste gets sweeter, milder less prickling on the tongue. The inventors have determined that the sweeter taste is due to the spherical smaller bubbles. The taste effect is verified for both beers and colas produced by the applicant company.

In the present context it should be noted that beverage dispensing at pressures significantly above the equilibrium pressure is not suitable because of the increased velocity of the beverage when leaving the beverage container.

The insoluble or hydrophobic constituents are generally in the form of fully protonated acids such as fatty acids or hydrophobic proteins. The insoluble or hydrophobic constituents may be in molecular form within the beverage, however, they are typically forming aggregates of several substantially identical acids, so-called micelles. The bubbles may have a spherical shape or similar such as elipsoidic shape. The major dimension of the ultra fine bubbles should be understood to be a straight line in-between the two points on the bubble surface which is furthest apart.

It has been surprisingly found out that by subjecting the carbonated beverage to an external isostatic pressure of at least 1.0 bar exceeding the equilibrium pressure of the beverage, ultra fine bubbles are generated, i.e. produced and maintained, or provided, in an amount exceeding $10^{10}$ ultra fine bubbles per milliliter of beverage. External isostatic pressure should in the present context be understood as a pressure applied. The pressure should thus be applied as a force acting on the outside of the beverage container in an inwardly direction, i.e. squeezing the beverage container. It should thereby not be understood to encompass a gas pressure, such as a carbon dioxide gas pressure, which is applied directly onto the beverage surface, since such pressure would influence the $CO_2$ pressure equilibrium such that more carbon dioxide is dissolved in the beverage resulting in a sour and prickling effect during drinking. Further, the expression 'external isostatic pressure' should not necessarily be construed to mean an evenly applied force onto the beverage container, since even though the force is applied at specific locations on the outside of the beverage container, due to the fact that the beverage is constricted within the beverage container, the pressure will be evenly applied onto the beverage via the beverage container.

The above object, the above features and the above advantage together with numerous other objects, advantages and features, which will be evident from the below detailed description of the present invention, are according to a second aspect of the present invention obtained by a beverage including:

dissolved and partially dissociated carbon dioxide present in an amount of 2-10 g/liter, such as 3-8 g/liter, preferably 4-6 g/liter, most preferably about 5.5 g/liter and establishing an equilibrium pressure at 10° C. of 0.5-3 bar above atmospheric pressure, and a water insoluble or hydrophobic constituent present in molecular form or in molecular aggregated form and having established ultra fine bubbles including gaseous carbon dioxide, the ultra fine bubbles being present in an amount exceeding $10^{10}$ ultra fine bubbles per milliliter, such as $10^{12}$-$10^{18}$ ultra fine bubbles per milliliter, preferably $10^{15}$-$10^{17}$ ultra fine bubbles per milliliter, most preferably about $10^{16}$ ultra fine bubbles per milliliter, the ultra fine bubbles having a major dimension smaller than 100 nm, such as 20-60 nm, preferably about 40 nm.

The beverage according to the second aspect of the invention is identical to the beverage according to the first aspect of the invention, except that the beverage according to the second aspect of the invention has been subjected to the above mentioned isostatic pressure which has caused the above mentioned ultra fine bubbles to generate. It has been surprisingly found out that a majority of the ultra fine bubbles may remain stable for an extended period of time, such as one month or even two months. The beverage thus includes three guises of $CO_2$, the well known dissolved and partially dissociated $CO_2$, the ordinary $CO_2$ gas within the bubble and the more densely packed $CO_2$ in the bubble wall.

The ultra fine bubbles will include carbon dioxide and some water vapour. The ultra fine bubbles will remain stable due to the fact that the insoluble or hydrophobic constituents, due to thermodynamic effects, will tend to reside at the bubble surface layer, in which the constituents may orient themselves such that a majority of the individual molecules making up the constituents may be outside of the liquid phase, i.e. located within the bubble. The insoluble or hydrophobic constituents will at a certain pressure form a monolayer, which will help stabilize the bubble and prevent it from collapsing.

The carbon dioxide in the bubble surface will be much more densely packed than the carbon dioxide within the bubble. However, the carbon dioxide in the bubble surface may rapidly migrate into the bubble in case the beverage is subjected to a shock, i.e. by dropping the beverage onto a hard surface. This explains the sudden pressure increase experiences after dropping a beverage bottle onto a concrete surface.

Since the ultra fine bubbles are smaller than the Abbe limit, the ultra fine bubbles are invisible, i.e. there is no visible diffraction of even violet visible light. The Abbe limit is given as $|Y|=0.82\lambda/(n \sin(\theta))$, in which $|Y|$ is the smallest distance two particles can have in order to be individually distinguishable, $\lambda$ is the wavelength, n is the refractive index (in water close to 1.33) and $\sin(\theta)$ is the viewing angle The resulting minimum bubble size in an aqueous substance which may be visually observed using a good microscope is thus about 80 nm.

The beverage according to the second aspect of the present invention will taste milder and sweeter due to the ultra fine bubbles. Tests have shown that such beverage may be enjoyed at significantly higher temperatures compared to the same beverage without or with less ultra fine bubbles. Thus, a carbonated beverage intended to be served at 5° C. may now be served at 10° C. which will result in reduced costs for cooling beverages.

According to a further embodiment, the beverage has a compressibility in the range between $10^{-4}$ $bar^{-1}$ and $10^{-2}$ $bar^{-1}$, preferably between $5*10^{-4}$ $bar^{-1}$ and $5*10^{-3}$ $bar^{-1}$, such as about $10^{-3}$ $bar^{-1}$. Beverage includes a majority of water which is essentially non-compressible having a compressibility not exceeding the magnitude of $10^{-5}$ $bar^{-1}$. Other constituents of the beverage is either present in very small quantities or are equally non-compressible. The beverage including ultra fine bubbles will have a larger compressibility due to the ultra fine bubbles which include carbon dioxide which is compressible. The compressibility may be used as a test for determining the amount of ultra fine bubbles present in the beverage, since the more ultra fine bubbles present in the beverage, the greater the compressibility of the beverage.

According to a further embodiment, the water insoluble or hydrophobic constituent comprises oily substances, fatty acids or proteins, which are either originally present in the beverage or alternatively added to the beverage. The insoluble or hydrophobic constituents are typically present naturally in the beverage as a result of the beverage production, e.g. the brewing process. Alternatively, or in order to enhance the effect of the already present insoluble or hydrophobic constituents, additional insoluble or hydrophobic constituents may be added to the beverage after production. The insoluble or hydrophobic constituents may e.g. constitute nutrients. They may also add or alter the flavour of the beverage.

The above object, the above features and the above advantage together with numerous other objects, advantages and features, which will be evident from the below detailed description of the present invention, are according to a third aspect of the present invention obtained by a beverage container including a beverage according to any of the first and second aspects, the beverage container defining a beverage space and a head space, the head space defining no more than 5.0%, preferably no more than 2.0% and more preferably no more than 1.5%, of the internal volume of the beverage container. The beverage either according to the first aspect or the second aspect is typically shipped within a sealed and essentially airtight beverage container. The head space typically contains carbon dioxide. In order to prevent additional gas from being dissolved into the beverage when increasing the external pressure, the head space should be kept as small as possible, i.e. no more than 2.0% of the total volume of the beverage container when the beverage container is filled by beverage. In this way, only a small amount of carbon dioxide may dissolve into the beverage. The head space is defined as the gaseous space in direct contact with the beverage.

According to a further embodiment, the beverage container is adapted to expose the beverage to an external isostatic pressure exceeding the equilibrium pressure of the beverage by at least 1.2 bar, preferably 1.2-60 bar, more preferably 1.5-10 bar, most preferably about 2 bar. The beverage according to the first aspect may in principle be shipped in any airtight container, which has a shelf life of typically one year or more. The beverage according to the second aspect will only have a shelf life of about 2 months, since the ultra fine bubbles have a typical half life in the range of some months. The beverage according to the second aspect may thus preferably be shipped in a specially adapted beverage container which is capable of maintaining the external isostatic pressure during transport and storage in order to maintain the amount of ultra fine bubbles essentially unchanged and thereby prolong the shelf life of the product. It is contemplated that an external pressure of at least 1.2 bar exceeding the equilibrium pressure will ensure the preservation of a sufficient amount of ultra fine bubbles in order to have the desired positive taste effect several months after production of the beverage. It is contemplated that for safety reasons the external pressure should not exceed 60 bar above the equilibrium pressure of the beverage.

According to a further embodiment, the beverage container is made of a flexible material and the external isostatic pressure is applied outside the beverage container. The container is typically a bottle or can made of thin material, which may be compressed when subjected to the external isostatic pressure.

According to a further embodiment, the beverage container defines a radial dimension and an axial dimension, the external isostatic pressure is applied as a pressure force in the radial dimension and/or in the axial dimension. The external pressure may e.g. be applied by clamping the beverage container. The clamping may be removed by the user just prior to consumption of the beverage.

According to a further embodiment, a container assembly is provided including a beverage container and an outer container completely encapsulating the beverage container and defining a space in-between the beverage container and the outer container, the space being filled by a gas, the gas subjecting the beverage container to the external isostatic pressure. In a preferred embodiment, a so-called double container is used in which the flexible container is enclosed by a pressure tight outer container, which may or may not be flexible. The external container is pressurised in order to subject the beverage container to the external isostatic pressure. The external container may be de-pressurized immediately prior to consumption of the beverage. Preferably, the openings of the beverage container and the outer container, respectively, are connected such that the pressure in the outer container is released when the beverage container is opened.

According to a further embodiment, the external isostatic pressure is applied as a mechanical pressure within the beverage container. The external isostatic pressure may e.g. be applied by means of a spring, which is included inside the beverage container and which may contract the beverage container or otherwise apply an isostatic pressure onto the beverage.

According to a further embodiment, the beverage container includes a lid, the lid subjecting the beverage to the isostatic pressure. Alternatively, the lid may include a pressurized balloon or spring, which applies the isostatic pressure onto the beverage. By removing the lid, the isostatic pressure is released. This embodiment has the advantage that the lid may be made tamper-proof, i.e. any opening of the lid will be immediately visible since it may be impossible or at least difficult to re-apply the lid or at least the pressure when the lid has been opened.

According to a further embodiment, the lid includes a flexible pouch initially including expanding agents for producing the isostatic pressure. The expanding agent may e.g. include citric acid and bicarbonate included in a flexible pouch, e.g. a plastic pouch. The flexible pouch is included in the beverage container and the citric acid and bicarbonate are mixed when the beverage container is capped, thereby causing the generation or gas for pressurizing the pouch, which in turn applies the isostatic pressure on the beverage.

According to a further embodiment, the beverage container comprises plastics or metal. Plastic and metal are both materials which may be made both flexible and essentially pressure- and air-tight.

The above object, the above features and the above advantage together with numerous other objects, advantages and features, which will be evident from the below detailed description of the present invention, are according to a fourth aspect of the present invention obtained by a method of improving the taste of a beverage, the method comprising:
   providing a beverage including:
      dissolved and partially dissociated carbon dioxide present in an amount of 2-10 g/liter, such as 3-8 g/liter, preferably 4-6 g/liter, most preferably about 5.5 g/liter and establishing an equilibrium pressure at 10° C. of 0.5-3 bar above atmospheric pressure, such as 1-2 bar, preferably about 1.5 bar, and
      a water insoluble or hydrophobic constituent present in molecular form or in molecular aggregated form and in an amount capable of generating ultra fine bubbles including gaseous carbon dioxide, the ultra fine bubbles being present in an amount exceeding $10^{10}$ ultra fine bubbles per milliliter, such as $10^{12}$-$10^{18}$ ultra fine bubbles per milliliter, preferably $10^{15}$-$10^{17}$ ultra fine bubbles per milliliter, most preferably about $10^{18}$ ultra fine bubbles per milliliter, when the beverage is exposed to an external isostatic pressure exceeding the equilibrium pressure of the beverage by at least 1.0 bar, preferably 1.2-60 bar, more preferably 1.5-10 bar, most preferably about 2 bar, the ultra fine bubbles having a major dimension smaller than 100 nm, such as 20-60 nm, preferably about 40 nm, and,
      subjecting the beverage to an external isostatic pressure exceeding the equilibrium pressure of the beverage by at least 1.0 bar, preferably 1.2-60 bar, more preferably 1.5-10 bar, most preferably about 2 bar.

The method according to the fourth aspect of the present invention may be used for producing a beverage according to the second aspect from a beverage according to the first aspect. The method may be applied in the brewery, i.e. immediately after the beverage has been produced and before the beverage is packed. Alternatively, the method is applied during dispensing of beverage from a beverage dispensing system.

The above object, the above features and the above advantage together with numerous other objects, advantages and features, which will be evident from the below detailed description of the present invention, are according to a fifth aspect of the present invention obtained by a beverage production plant or beverage treatment assembly for improving the taste of a beverage, the beverage production plant or beverage treatment assembly including:
   a vessel or beverage supply tube for accommodating a beverage, the beverage comprising:
      dissolved and partially dissociated carbon dioxide present in an amount of 2-10 g/liter, such as 3-8 g/liter, preferably 4-6 g/liter, most preferably about 5.5 g/liter and establishing an equilibrium pressure at 10° C. of 0.5-3 bar above atmospheric pressure, such as 1-2 bar, preferably about 1.5 bar, and
      a water insoluble or hydrophobic constituent present in molecular form or in molecular aggregated form and in an amount capable of generating ultra fine bubbles including gaseous carbon dioxide, the ultra fine bubbles being present in an amount exceeding $10^{10}$ ultra fine bubbles per milliliter, such as $10^{12}$-$10^{18}$ ultra fine bubbles per milliliter, preferably $10^{15}$-$10^{17}$ ultra fine bubbles per milliliter, most preferably about $10^{16}$ ultra fine bubbles per milliliter, when the beverage is exposed to an external isostatic pressure exceeding the equilibrium pressure of the beverage by at least 1.0 bar, preferably 1.2-60 bar, more preferably 1.5-10 bar, most preferably about 2 bar, the ultra fine bubbles having a major dimension smaller than 100 nm, such as 20-60 nm, preferably about 40 nm, and
   a pressure generating device capable of subjecting the beverage to an external isostatic pressure exceeding the equilibrium pressure of the beverage by at least 1.2 bar, preferably 1.0-60 bar, more preferably 1.5-10 bar, most preferably about 2 bar.

The beverage production plant or beverage treatment assembly according to the fifth aspect of the present invention may be used for carrying out the method according to the fourth aspect. The production plant may be used in the brewery, i.e. immediately after the beverage has been produced and before the beverage is packed. Alternatively, the production plant is supplied as an accessory or upgrade to a beverage dispensing system. The external isostatic pressure may either be applied while storing the beverage in a vessel such as a large keg or alternatively in a continuous process when the beverage is transported in a flexible beverage tube. The external isostatic pressure should be applied constantly and should not be used in order to dispense the beverage from the vessel or tube.

BRIEF DESCRIPTION OF THE DRAWINGS

FIGS. 2A-2E illustrate the production of a beverage container according to the present invention.

FIGS. 3A-3E illustrate an alternative mode of producing a beverage container according to the present invention.

FIGS. 4, 4A, and 4B illustrate the opening of a beverage container made of glass and having a metal cap according to the present invention.

FIGS. 5, 5A, and 5B illustrate the opening of a plastic beverage container according to the present invention.

FIGS. 6, 6A and 6B illustrate the opening of a metal beverage container according to the present invention.

FIGS. 7, 7A, and 7B illustrate the opening of an beverage container having a twist off cap according to the present invention.

FIGS. 11A-11G illustrate a bag-in-bottle beverage container according to the present invention.

FIGS. 12A-12H illustrate a delaminated beverage container according to the present invention.

DETAILED DESCRIPTION

The below detailed description discloses various specific embodiments according to the present invention for the generation and maintenance of ultra fine bubbles in carbonated beverages.

Figure 1C:
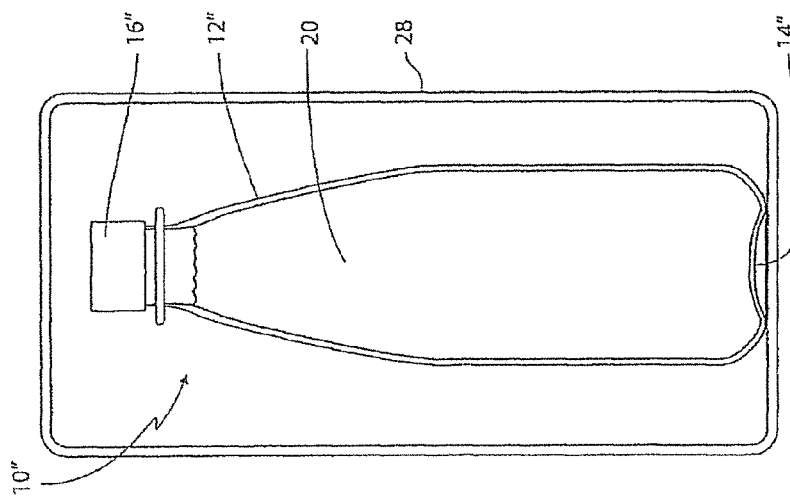
FIGS. 1A-1C illustrate various beverage containers according to the present invention.
Figure 1B:
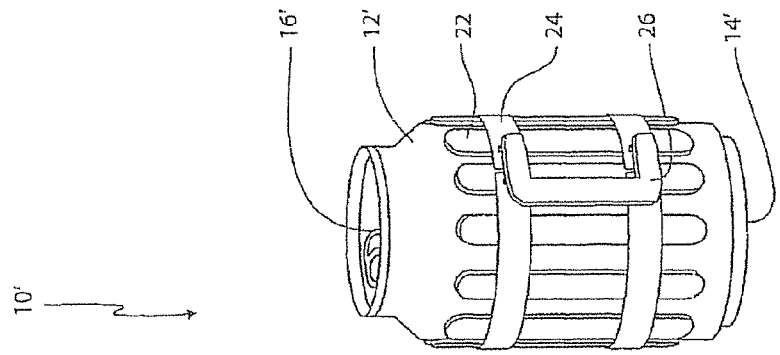
Figure 1A:
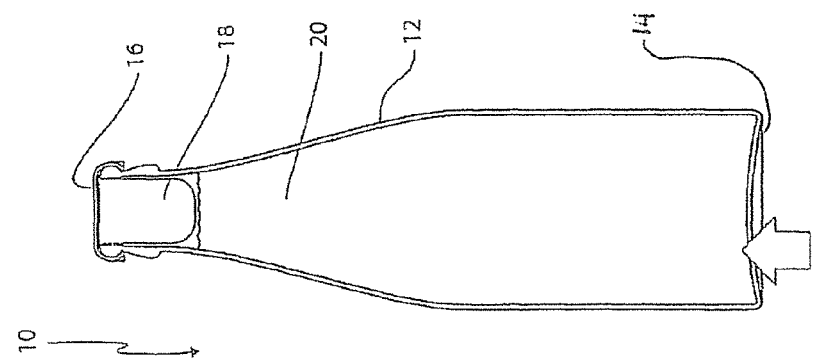

FIG. 1A shows a first embodiment of a self pressurized beverage container 10 filled by beverage 20 according to the present invention. The beverage container 10 comprises a cylindrical wall 12 and a circular bottom 14 being made of glass or plastics. The beverage container 10 has a metal cap 16. The cap 16 includes a pouch 18 made of flexible material such as plastics or rubber and oriented towards the interior of the beverage container 10. The pouch 18 is separated from the beverage 20 and is pressurized by gas. The pouch 18 applies, together with the wall 12 and the bottom 14, an isostatic pressure onto a beverage 20 stored within the container 10. The beverage may be any carbonated beverage as described above including the above mentioned insoluble or hydrophobic constituents. The isostatic pressure applied by the pouch 18 on to the beverage 20 is at least 1 bar above the equilibrium pressure of the beverage 20. The beverage 20 has an equilibrium pressure at 10° C. of about 0.5-3 bar, corresponding to an amount of dissolved and partially dissociated carbon dioxide of about 5.5 g/liter and establishing an equilibrium pressure at 10° C. of about 1.5 bar. The carbonated beverage 20, being e.g. a beer, champagne, tonic, cola or similar beverages, is further including a water insoluble or hydrophobic constituent, which may be a fatty acid. The insoluble or hydrophobic constituent may be naturally present in the beverage or provided as an additive and may e.g. constitute a nutrient or flavour to the beverage or may be a flavorless additive. The insoluble or hydrophobic constituent in combination with the carbon dioxide and the external isostatic pressure applied by the pouch 18 allow the beverage 20 to generate and maintain a substantial amount of ultra fine bubbles including gaseous carbon dioxide. The ultra fine bubbles have a major dimension of about 40 nm and are therefore invisible and the number of ultra fine bubbles present in the beverage amounts to about $10^{16}$ ultra fine bubbles per milliliter.

FIG. 1B shows a beverage container 10' according to the present invention. The beverage container 10' comprises a flexible aluminium can having a cylindrical wall 12', a circular bottom 14' and a cylindrical cap 16'. The beverage container 10' is filled with carbonated beverage (not shown) similar to the embodiment shown in FIG. 1A. The present beverage container has no pressurized pouch as described above in connection with the previous embodiment, but instead the cylindrical wall 12' is surrounded by bars 22 extending in the longitudinal direction along the outer surface of the cylindrical wall 12'. The bars 22 are made of metal or alternatively rigid plastics. The bars 22 are configured to apply a substantially uniform radial pressure onto the cylindrical wall 12'. The bars 22 are joined together by straps 24, which are clamped together at high strain by the use of a clamping mechanism 26. The aluminium can 12' may optionally also be clamped in the longitudinal direction by applying further straps and a clamping mechanism between the cap 16' and the bottom 14'. The beverage container 10' remains clamped during transport and storage. The total mechanical pressure applied to the beverage container 10' results in an external pressure on the beverage of at least 1 bar above the equilibrium pressure of the carbonated beverage (not shown) included in the beverage container 10'. Other similar arrangements e.g. shrink-wrapping of the beverage container or an internal clamping mechanism capable of contracting the beverage container may be contemplated for achieving similar result. It is understood that the clamping mechanism should be removed before opening the container in order to avoid spillage.

FIG. 1C shows a beverage container 10" according to the present invention. The beverage container 10" comprises a cylindrical wall 12" and a circular bottom 14" being made of flexible plastic material. The beverage container 10" has a cap 16" made of rigid plastics. The beverage container 10" is filled with carbonated beverage 20 similar to the embodiment shown in FIG. 1A. The beverage container 10" does not have a pressurized pouch but is surrounded by an outer container 28 made of plastics. The outer container 28 is pressurized at 1 bar or more above the equilibrium pressure of the beverage 20, thereby applying an external isostatic pressure onto the beverage 20. When the beverage 20 is about to be consumed, the pressure is released from the outer container 28, the beverage container 10" is removed from the outer container 28 and the cap 16" is removed.

FIG. 2A shows the filling of a beverage container 10 as described in connection with FIG. 1A. The beverage container 10 is filled by introducing a filling pipe 30 into the beverage container 10 and introducing the carbonated beverage 20. About 1.5% of the volume of the beverage container 10 should be constituted by head space and the remaining about 98.5% of the volume should be filled by beverage 20. The beverage filling typically takes place at low temperature just above freezing temperature and within a carbon dioxide atmosphere in order to achieve a suitable level of carbon dioxide within the beverage container 10.

FIGS. 2B and 2C show the beverage container 10 when it has been filled and capped but prior to pasteurization. In the close-up view, the cap 16 is shown in detail. The cap 16 includes the pouch 18, which is oriented towards the beverage 20 and is a part of the sealing between the cap 16 and the cylindrical wall 12 of the beverage container 10. The pouch 18 is shown in contracted state and includes expanding agents 32 capable of generating pressurizing gas such as e.g. solid carbon dioxide or alternatively foaming material.

FIGS. 2D and 2E show the beverage container 10 during pasteurization. The beverage container 10 is thus located within a pasteurization plant 34. The heat from pasteurization is thereby used as initiator for causing the expanding agents 32 to generate pressurized gas. The pouch 18 is thereby inflated and subjects the beverage 20 to the external isostatic pressure described above.

FIG. 3A shows the filling of a slightly modified beverage container 10 as described in connection with FIG. 1A. The beverage container 10 is filled by introducing a filling pipe 30 into the beverage container 10 and introducing the carbonated beverage 20 similar to FIG. 2A.

FIGS. 3B and 3C show the beverage container 10 when it has been filled and capped but prior to pasteurization. In the close-up view, the cap 16 is shown in detail. The cap 16 includes an alternative pouch 18', which is oriented towards the beverage 20 and is a part of the sealing between the cap 16 and the cylindrical wall 12 of the beverage container 10. The pouch 18 is shown in contracted state and includes a pressurization device 36 including expanding agents. The pressurization device 36 includes a first chamber including a first reactant 38 and a second chamber including a second reactant 40. The reactants are separated by a rupturable membrane 42. The second chamber further includes a piercing device oriented towards the rupturable membrane 42. The first reactant 38 may e.g. constitute citric acid and the second reactant 40 may e.g. constitute bicarbonate.

FIGS. 3D and 3E show the beverage container 10 during pasteurization. The beverage container 10 is thus located within a pasteurization plant 34. The pressure from pasteurization is thereby used as initiator for causing the piercing device 44 to rupture the rupturable membrane 42, thereby allowing the first and second reactants 38, 40 to mix and generate pressurization gas such as carbon dioxide for pressurizing the pouch 18 and thereby apply the external isostatic pressure onto the beverage 20.

Figure 4:
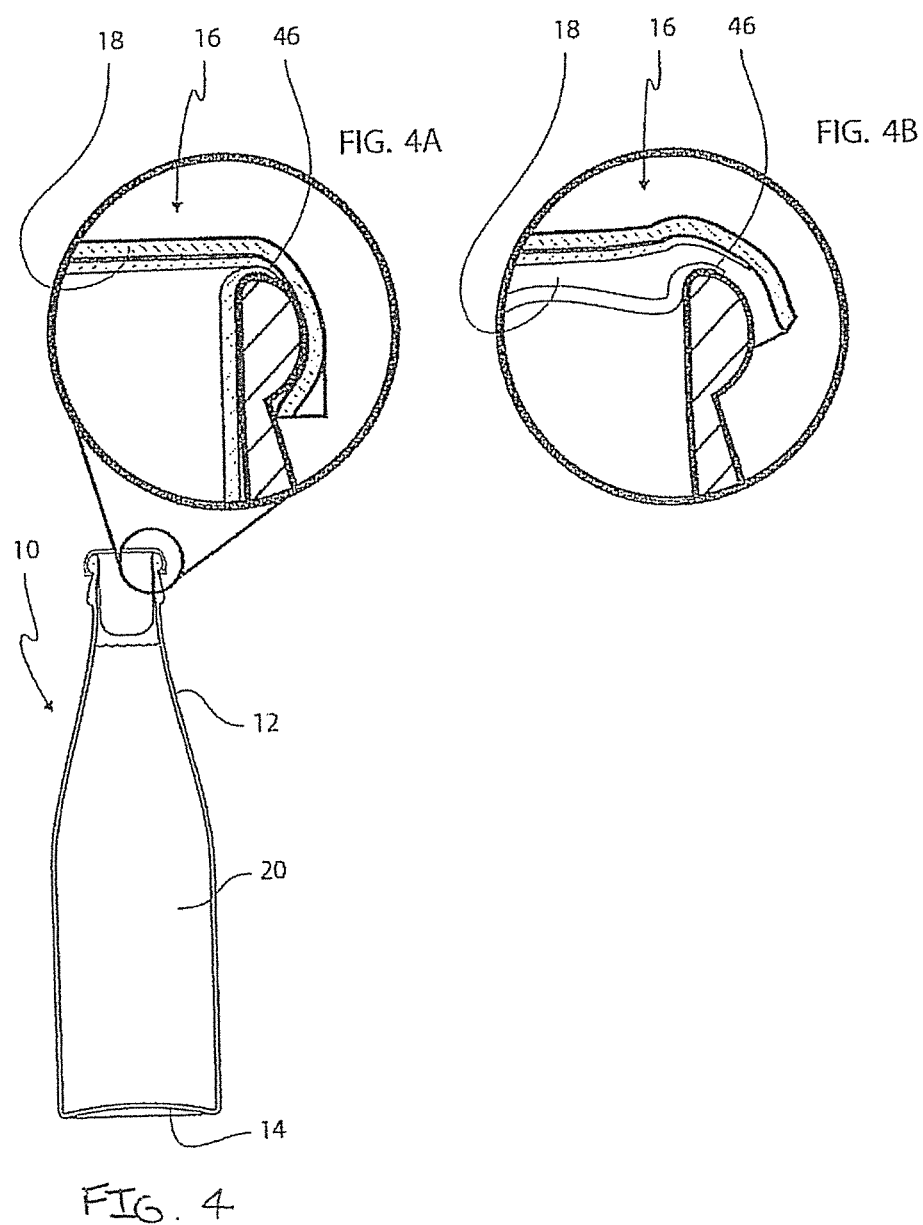

FIGS. 4 and 4A show the upper part of the cylindrical wall 12 and the cap 16 of the glass beverage container 10. The metal cap 16 is clamped around a mouth 46 located at the end of the cylindrical wall 12 of the beverage container 10. The pouch 18 is part of the sealing between the cap 16 and the mouth 46.

FIG. 4B shows the upper part of the cylindrical wall 12 and the cap 16 of the beverage container 10. When the beverage container 10 is to be opened, the cap 16 is bent upwardly by the use of a generally known bottle opener. When doing so, the sealing between the mouth 46 and the cap 16 is broken and at the same time the pouch 18 is opened and the pressurized gas located therein is released before any beverage 20 is allowed to escape. The release of the pressure causes the pouch 18 to deflate and the pouch 18 is removed together with the cap 16.

Figure 5:
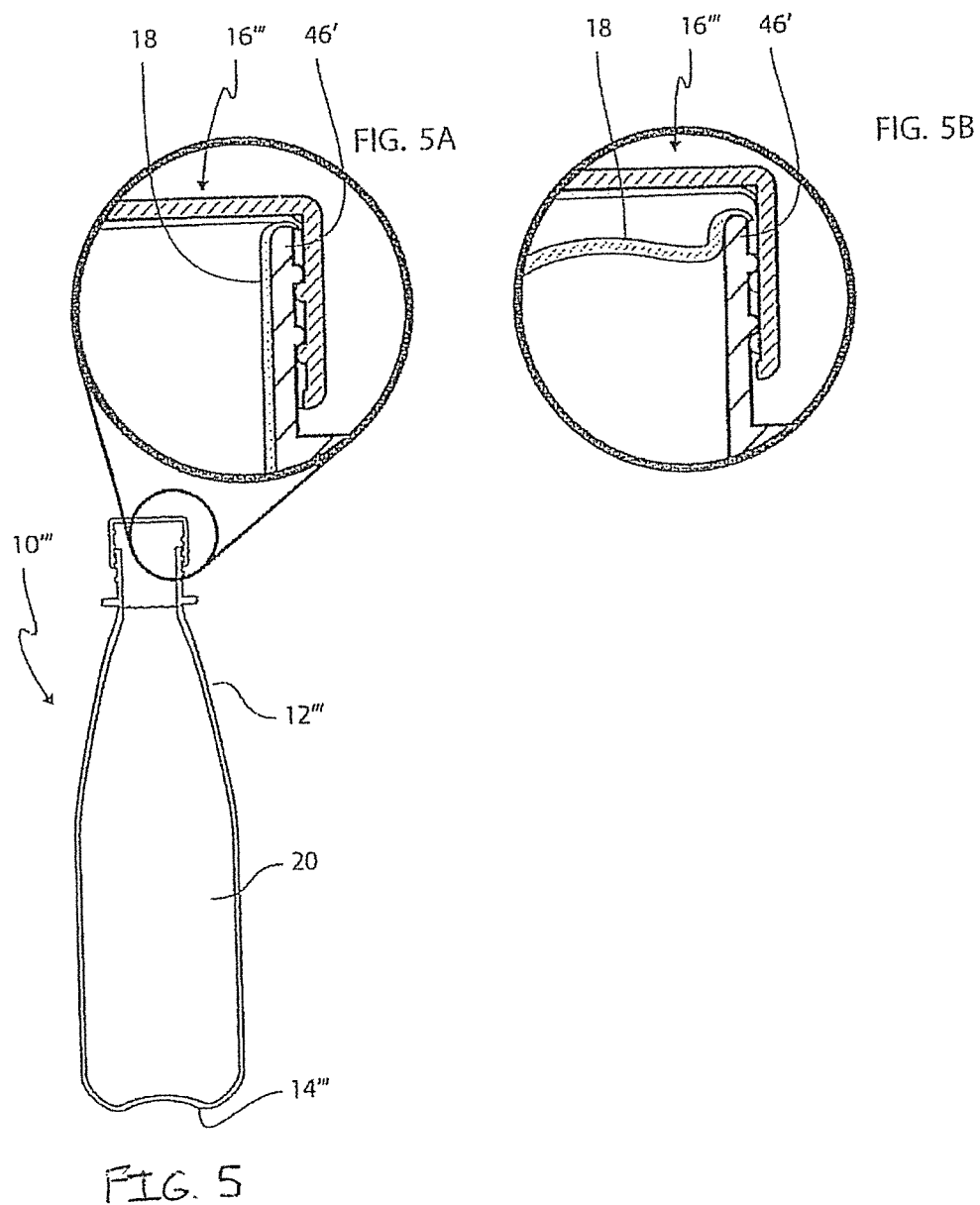

FIGS. 5 and 5A show shows the upper part of the cylindrical wall 12''' and the cap 16''' of a plastic beverage container 10''' being similar to the previous embodiment; however, the threaded plastic cap 16''' is screwed around a threaded mouth 46' located at the end of the cylindrical wall 12' of the beverage container 10'''. The pouch 18 is part of the sealing between the cap 16' and the mouth 46'.

FIG. 5B shows the upper part of the cylindrical wall 12''' and the cap 16''' of the beverage container 10'''. When the beverage container 10''' is to be opened, the cap 16''' is turned. When doing so, the sealing between the mouth 46' and the cap 16 is broken and at the same time the pouch 18 is opened and the pressurized gas located in the pouch 18 is released via the generally available depressurization slits of common screw bottles before any beverage 20 is allowed to escape. The release of the pressure causes the pouch 18 to deflate and the pouch 18 is removed together with the cap 16'''.

Figure 6:
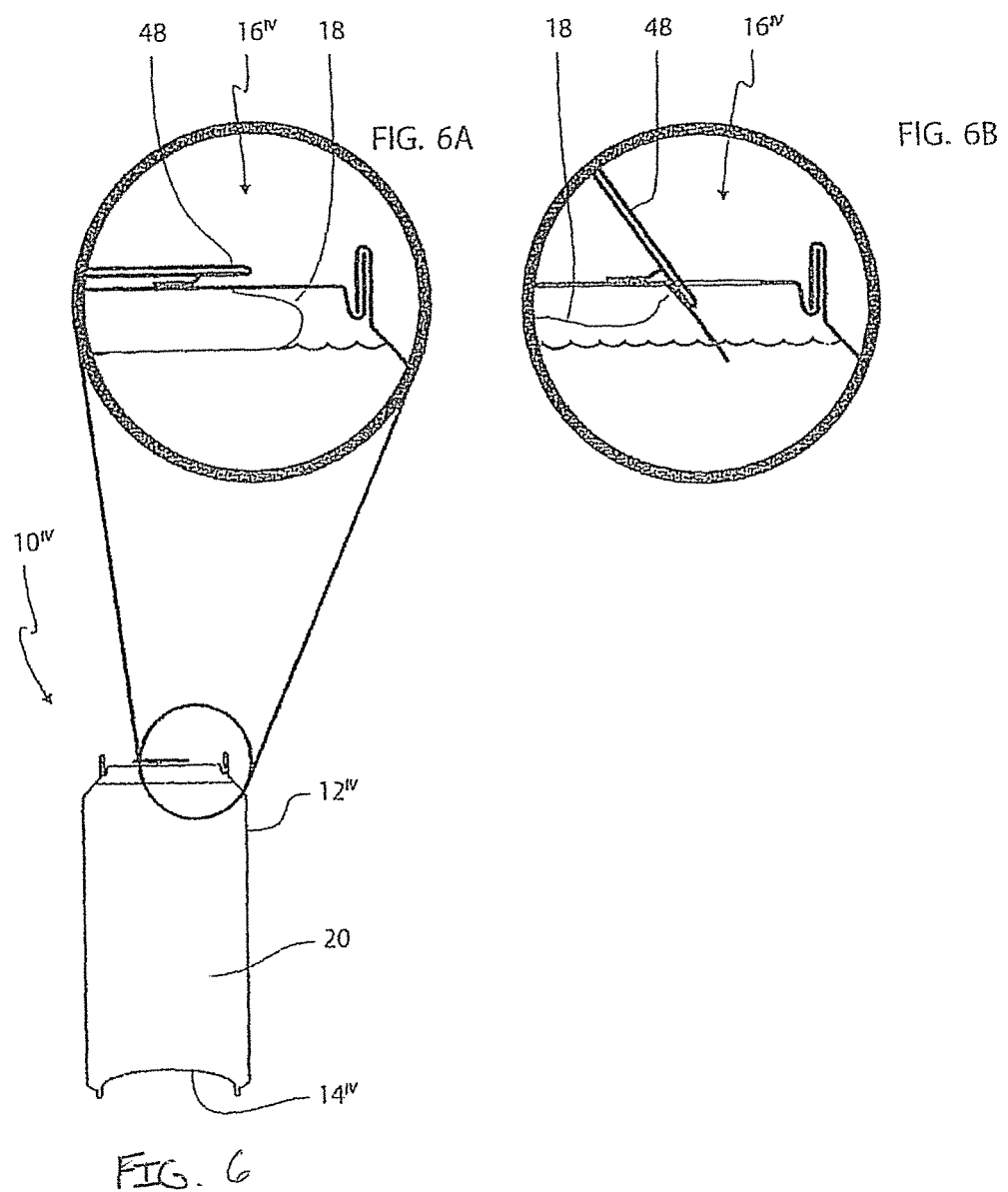

FIGS. 6 and 6A show the upper part of the cylindrical wall $12^{IV}$ and the cap $16^{IV}$ of a beverage container $10^{IV}$ being similar to the previous embodiment, however the beverage container $10^{IV}$ constitutes a metal can and the cap $16^{IV}$ includes a tab 48 for opening the beverage container $10^{IV}$. The pouch 18 is part of the cap $16^{IV}$. The pouch 18 is located adjacent the tab 48 and oriented towards the beverage 20.

FIG. 6B shows the upper part of the cylindrical wall $12^{IV}$ and the cap $16^{IV}$ of the beverage container $10^{IV}$. When the beverage container $10^{IV}$ is to be opened, the tab 48 is operated in order to open the cap $16^{IV}$ along a predetermined breaking line (not shown). The predetermined breaking line is arranged such that the resulting opening initially only allows access to the pouch 18 so that the pressurized gas located in the pouch 18 is released. By operating the tab 48 further, the opening widens such that the beverage may flow out.

FIGS. 7 and 7A show the upper part of the cylindrical wall $12^V$ and the cap $16^V$ of a beverage container $10^V$ being similar to the embodiment shown in connection with FIG. 5, i.e. the threaded cap $16^V$ is screwed around a threaded mouth 46" located at the end of the cylindrical wall $12^V$ of the beverage container $10^V$. The pouch 18 is also part of the sealing between the cap $16^V$ and the mouth 46". However, the cylindrical walls $12^V$ and the bottom $14^V$ are both made of glass and the cap $16^V$ is made of metal. This is generally known as a twist-off cap.

FIG. 7B shows the upper part of the cylindrical wall $12^V$ and the cap $16^V$ of the beverage container $10^V$. When the beverage container $10^V$ is to be opened, the cap $16^V$ is twisted. When doing so, the sealing between the mouth 46" and the cap $16^V$ is broken and at the same time the pouch 18 is opened and the pressurized gas located in the pouch 18 is released before any beverage 20 is allowed to escape. The release of the pressure causes the pouch 18 to deflate and the pouch 18 is removed together with the cap $16^V$. The deflated pouch will prevent the cap $16^V$ from being replaced on the mouth 46" and thus the present beverage container $10^V$ is tamper-proof although the cap $16^V$ as such may be left without any other traces of being opened.

Figure 8B:
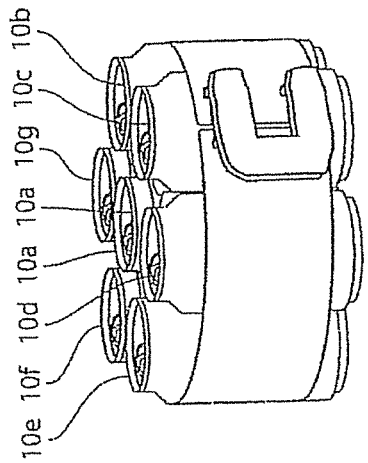
FIGS. 8A-8C illustrate a multipack comprising seven beverage containers.
Figure 8C:
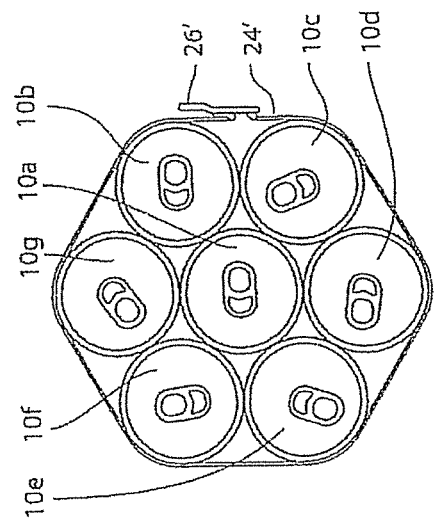
Figure 8A:
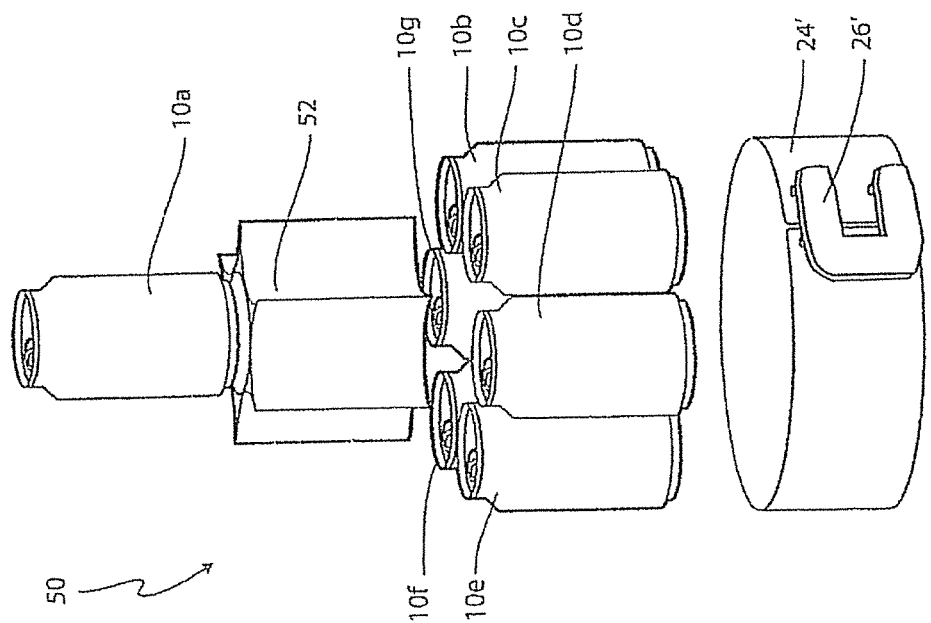

FIG. 8A shows an exploded perspective view of a multi-pack 50 of seven flexible metal beverage containers 10a-g configured with one central beverage container 10a, a spacer 52 enclosing the central beverage container 10' and six beverage containers 10b-g distributed around the spacer 52. The beverage containers 10a-g have no inherent pressurization devices. The six beverage containers 10b-g are joined together by a strap 24', which is clamped together at high strain by the use of a clamping mechanism 26'. The flexible metal beverage containers 10a-g may optionally also be clamped in the longitudinal direction by applying further straps and a clamping mechanism between the caps and the bottoms of the flexible metal beverage containers 10a-g. The multipack 50 remains intact during transport and storage. The total mechanical pressure force applied to each of the seven flexible metal beverage containers 10a-g results in an external pressure on the beverage of at least 1 bar above the equilibrium pressure of the carbonated beverage (not shown) included in the beverage containers 10a-g. Other similar arrangements, e.g. shrink-wrapping of a multipack may be contemplated for achieving similar result. It is understood that the multipack 50 should be disassembled by releasing the clamping mechanism 26' before opening one of the seven flexible metal beverage containers 10a-g in order to avoid spillage. It should be noted that flexible plastic bottles are equally feasible in the present context.

FIG. 8B is a side perspective view of the multipack 50 of FIG. 8A.

FIG. 8C is a top view of the multipack 50 of FIG. 8A.

Figure 9:
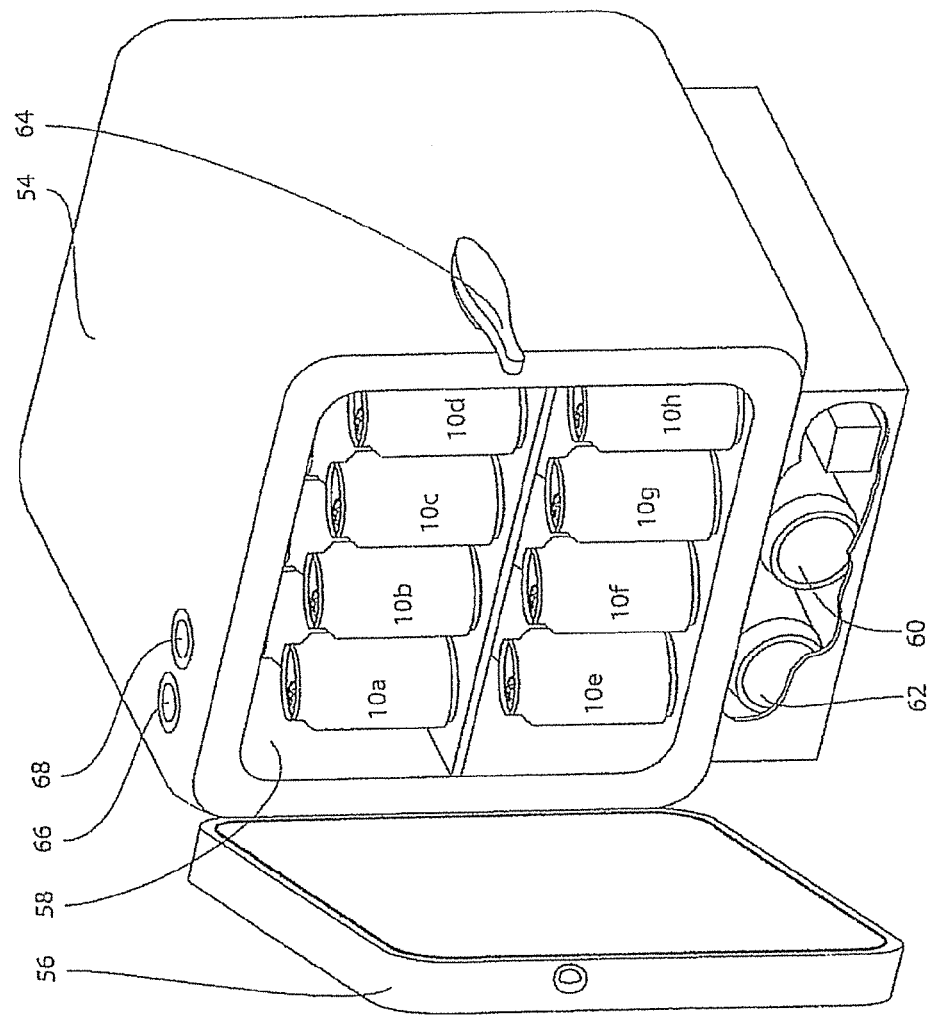
FIG. 9 illustrates a refrigerator for storing a plurality of beverage containers made of metal.

FIG. 9 shows a perspective view of a refrigerator 54. The refrigerator 54 comprises a door 56, which may be closed to form a hermetically sealed inner space 58. The inner space 58 includes standard flexible beverage containers 10a-g in the form of metal cans, however, flexible plastic bottles are equally feasible. The cans or bottles are without any inherent pressurization devices such as pouches as described above. The inner space 58 may be pressurized to at least 1 bar above the equilibrium pressure of the carbonated beverage (not shown) included in the beverage containers 10a-h by means of an air compressor 60. The inner space 58 may further be chilled to 10° C. or lower by means of a cooling device 62. The door is secured by means of a lock 64. When a user desires a beverage container 10a-h, the user will press the "open" button 66 in order to decompress the inner chamber 58 after which the door 56 is automatically or manually opened. When the user has removed one or more of the beverage containers 10a-h, the user closes the door 56 and pushes the "close" button 68 in order to re-pressurize the inner space 58 by means of the compressor 60. The beverages are thus kept at a pressure condition, which favours the generation and maintenance of ultra fine bubbles.

Figure 10:
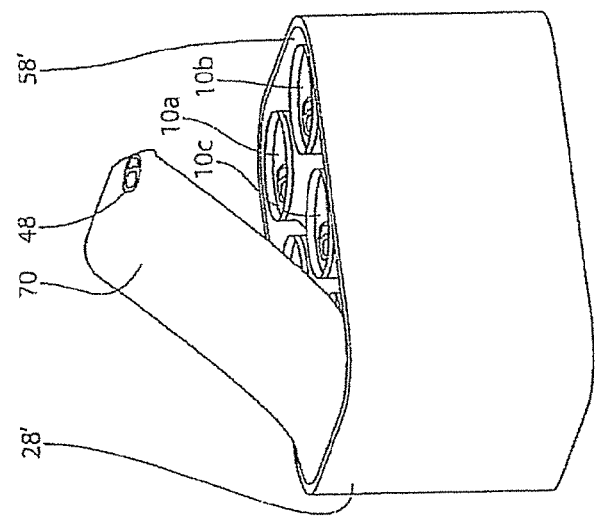
FIG. 10 illustrates another multipack comprising six beverage containers.

FIG. 10 shows another multipack 50' comprising a pressure tight outer container 28'. The outer container 28' defines an inner space 58' including six standard flexible beverage containers 10a-f. The multipack further comprises a removable lid 70 for closing off the inner space 58' of the outer container 28'. The inner space 58' of the outer container 28' is pressurised during transport and storage to at least 1 bar above the equilibrium pressure of the carbonated beverage (not shown) included in the beverage containers 10a-f. When a user desires a beverage, the user pulls a tab 48' to remove the lid 70 to access the flexible beverage containers 10a-f. By removing the lid 70, the user at the same time depressurises the multipack, however, the ultra fine bubbles will remain within the unopened beverage containers 10a-f for a time period of about one month or more.

FIG. 11A shows the filling of a bag-in-bottle beverage container $10^{VI}$. The beverage container $10^{VI}$ comprises a cylindrical wall $12^{VI}$, a circular bottom $12^{VI}$ and a flexible pouch 18' located within the cylindrical wall $12^{VI}$ and the circular bottom $12^{VI}$. The flexible pouch 18' and the cylindrical wall $12^{VI}$ are joined at a mouth 46''' constituting the opening of the beverage container $10^{VI}$. An expanding agent 32 is located between the pouch 18' and the cylindrical wall $12^{VI}$/circular bottom $12^{VI}$. The beverage container 10 is filled by introducing a filling pipe 30 into the flexible pouch 18' of the beverage container 10 through the mouth 46''' situated at the upper portion of the cylindrical wall $12^{VI}$ and the flexible pouch 18' and introducing the carbonated beverage 20 similar to FIG. 2A.

FIG. 11B shows the capping of the bag-in-bottle beverage container $10^{VI}$. After filling, a cap $16^{VI}$ is applied onto the mouth 46''' sealing off both the flexible pouch 18' and the expanding agent 32.

FIG. 11C shows the pasteurization of the beverage container $10^{VI}$. During pasteurization, the expanding agent 32 will initiate due to the heat produced by the pasteurization and form pressurized gas, which will subject the flexible pouch 18' to a pressure of at least 1 bar above the equilibrium pressure of the carbonated beverage 20 included in the pouch 18'. The head space within the pouch 18' will thereby be reduced and the pouch 18' will be slightly compressed.

Figures 11D, 11E, 11F, 11G:
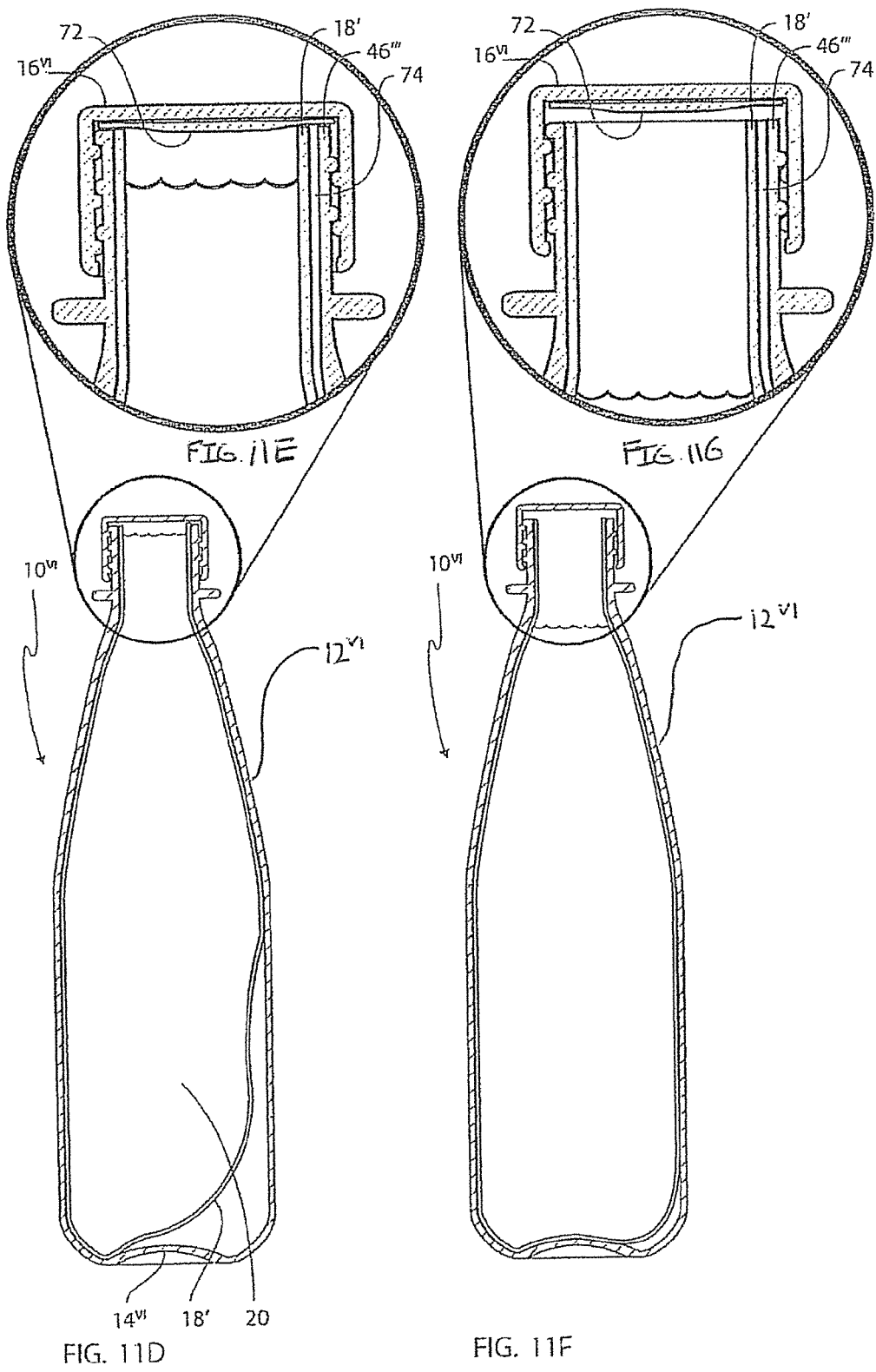

FIGS. 11D and 11E show the beverage container $10^{VI}$ when closed off by the cap $16^{VI}$. As can be seen from the close-up view, a seal 72 of the cap $16^{VI}$ seals off both the pouch 18' and the cylindrical wall $12^{VI}$ at the mouth 46'''. A small gap 74 is present between the pouch 18' and the cylindrical wall $12^{VI}$ at the mouth 46'''.

FIGS. 11F and 11G show shows the beverage container $10^{VI}$ when being opened. The mouth 46''' has an outer threading and the cap $16^{VI}$ has an inner threading, thus the cap $16^{VI}$ is removed by turning it in relation to the mouth 46'''. When the cap $16^{VI}$ has been turned a specific distance, the seal 72 will separate from the mouth 46''' such that the gas located between the pouch 18' and the cylindrical wall $12^{VI}$ may escape through the gap 74 and the depressurization slots located in the threading of the cap $16^{VI}$ and the mouth 46''', thus depressurising the pouch 18' in order to avoid any spillage of beverage. When the cap $16^{VI}$ has been completely removed, the user may enjoy the beverage.

Figure 12A:
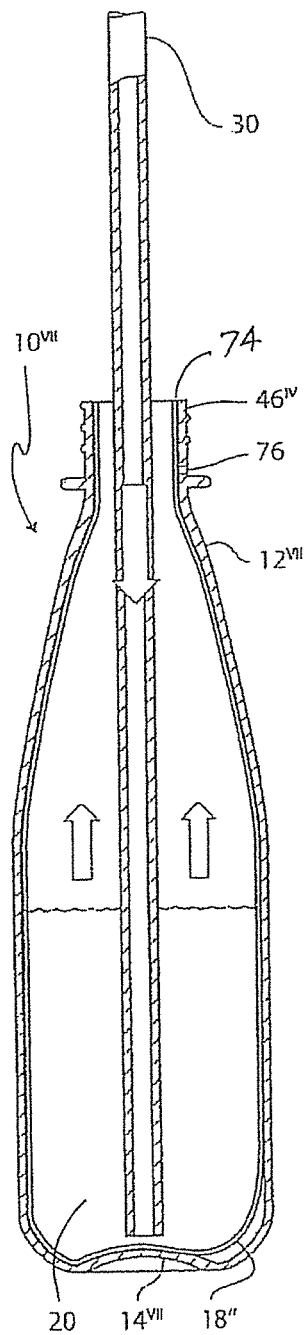

FIG. 12A shows the filling of a delaminated beverage container $10^{VII}$. The delaminated beverage container $10^{VII}$ comprises a cylindrical wall $12^{VII}$, a circular bottom $14^{VII}$ and a delaminated flexible pouch 18'' located within the cylindrical wall $12^{VII}$ and the circular bottom $14^{VII}$. The flexible pouch 18'' and the cylindrical wall $12^{VII}$ are joined at a mouth $46^{IV}$ constituting the opening of the beverage container $10^{VII}$ such that the flexible pouch 18'' is accessible via the mouth $46^{IV}$. The space in-between the pouch 18'' and the cylindrical wall $12^{VII}$ will only be accessible via a bore 76 extending through the cylindrical wall $12^{VI}$ at the mouth $46^{IV}$. The beverage container $10^{VII}$ is filled by introducing a filling pipe 30 into the flexible pouch 18'' of the beverage container $10^{VII}$ through the mouth $46^{IV}$ situated at the upper portion of the cylindrical wall $12^{VII}$ and the flexible pouch 18'' and introducing the carbonated beverage 20 similar to FIG. 2A.

Figure 12B:
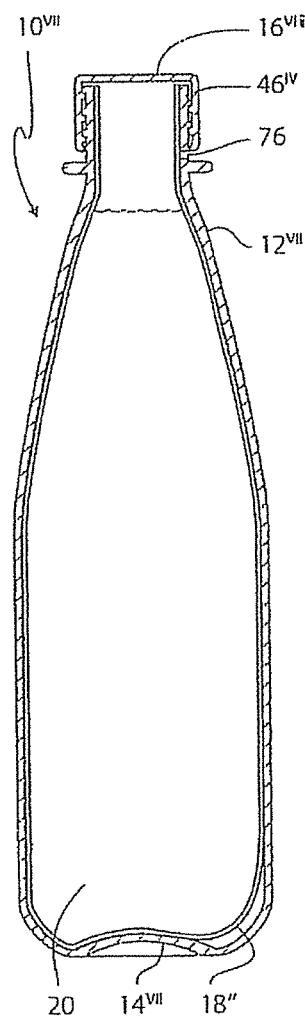

FIG. 12B shows the capping of the delaminated beverage container $10^{VII}$. After filling, a cap $16^{VII}$ is applied onto the mouth $46^{IV}$ sealing off the flexible pouch 18''.

Figure 12C:
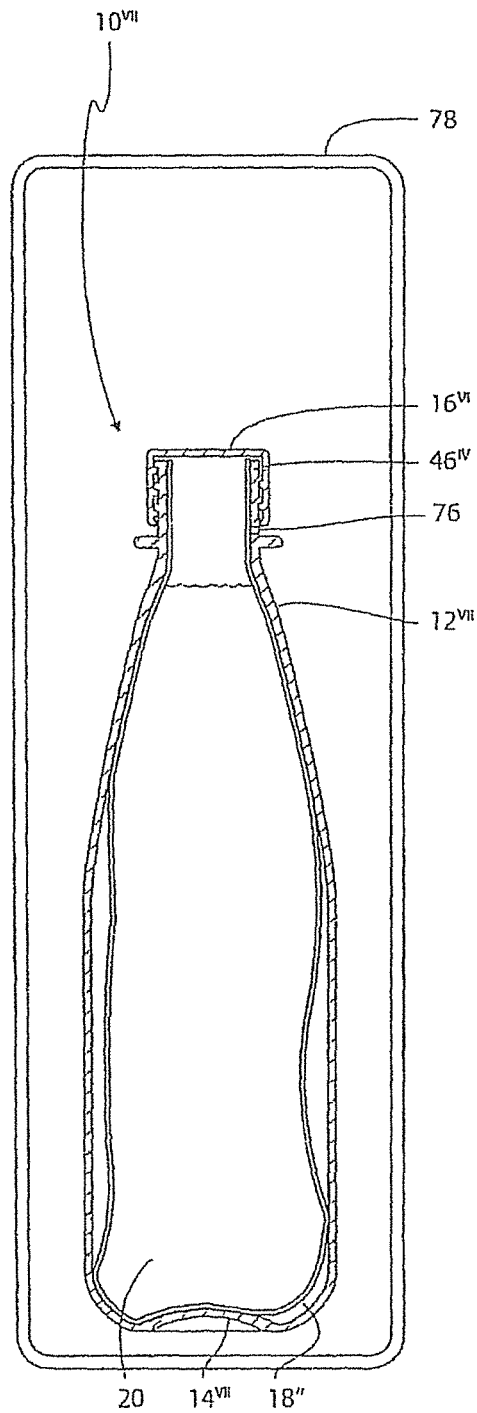

FIG. 12C shows the pressurization of the beverage container $10^{VII}$. During pressurization, the beverage container $10^{VII}$ is put into a pressure chamber 78, thereby pressurized gas, such as air, having a pressure of at least 1 bar above the equilibrium pressure of the carbonated beverage 20 included in the pouch 18'' will enter the space in-between the pouch 18'' and the cylindrical wall $12^{VII}$. The head space within the pouch 18'' will thereby be reduced and the pouch 18'' will be slightly compressed.

Figure 12D:
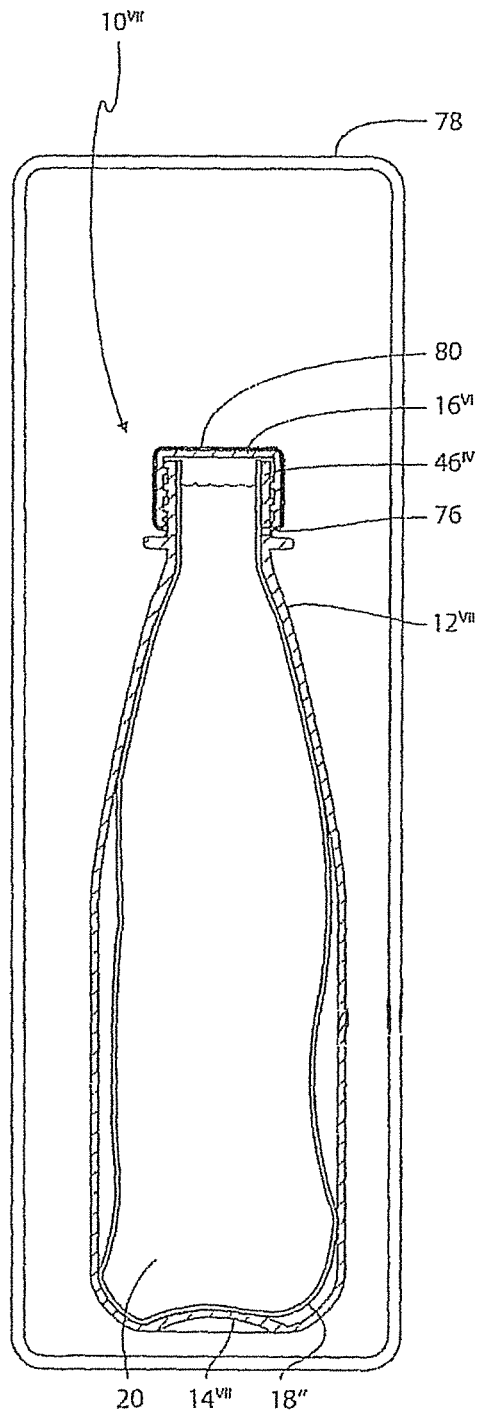

FIG. 12D shows the beverage container $10^{VII}$ when a cover 80 is applied outside the cap $16^{VII}$. The cover 80 seals the bore 76.

FIGS. 12E and 12F show the beverage container $10^{VII}$ when closed off by the cap $16^{VII}$. As can be seen from the close-up view, the cap $16^{VII}$ will not extend as far as to seal the bore 76. The bore 76 is instead hermetically sealed by the cover 80 applied outside the cap $16^{VII}$. The cover 80 may e.g. be shrink-wrapped onto the cap $16^{VII}$. In an alternative embodiment, the cap $16^{VII}$ may extend to seal off the bore 76 as well FIG. 12F shows the beverage container $10^{VII}$ when being opened. First of all, the cover 80 is removed such that the gas located between the pouch 18' and the cylindrical wall $12^{VI}$ may escape through the bore 76, thus depressurising the pouch 18" in order to avoid any spillage of beverage. The mouth $46^{IV}$ has an outer threading and the cap $16^{VII}$ has an inner threading, thus, secondly, the cap $16^{VII}$ is removed by turning it in relation to the mouth 46"'. When the cap $16^{VII}$ has been turned a specific distance, the seal 72 will separate from the mouth $46^{IV}$. When the cap $16^{VII}$ has been completely removed, the user may enjoy the beverage.

Figure 13:
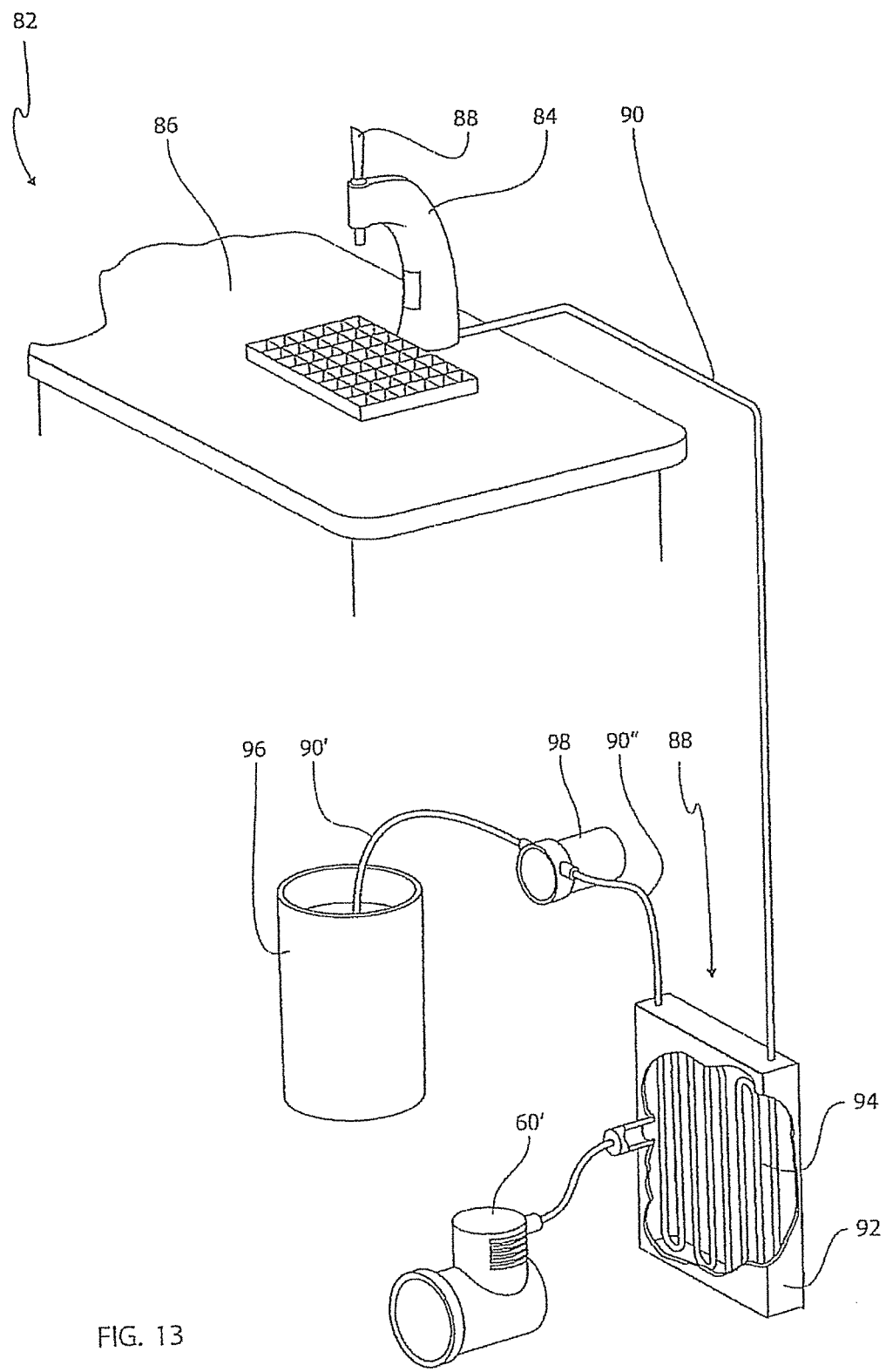
FIG. 13 illustrates a beverage dispensing system for dispensing beverage according to the present invention.

FIG. 13 shows a beverage dispensing system 82 comprising a tap column 84 located on a bar counter 86. The tap column 84 comprises a dispensing valve operated by a handle 88 for controlling the beverage dispensing. The dispensing valve of the tap column 84 is connected to a beverage treatment assembly 88 via a tapping line 90. The beverage treatment assembly 88 comprises an outer vessel 92. The tapping line 90 is connected to a flexible line part 94 extending within the vessel 92. The flexible line part 94 is supplied with beverage from a steel keg 96 by a pump 98 and tapping line parts 90' and 90", all of which being located outside the beverage treatment assembly 88. The vessel 92 may be pressurized to pressure of at least 1 bar above the equilibrium pressure of the carbonated beverage in the steel keg 96 by an air compressor 60'. The beverage is thus continuously during dispensing subjected to a pressure sufficient for generating ultra fine bubbles within the beverage. The tapping line may include a pressure reduction valve or constriction in order to avoid an excessive pressure within the tap column. The pump 98 may include a counter valve to avoid a reverse flow of beverage.

Figure 14:
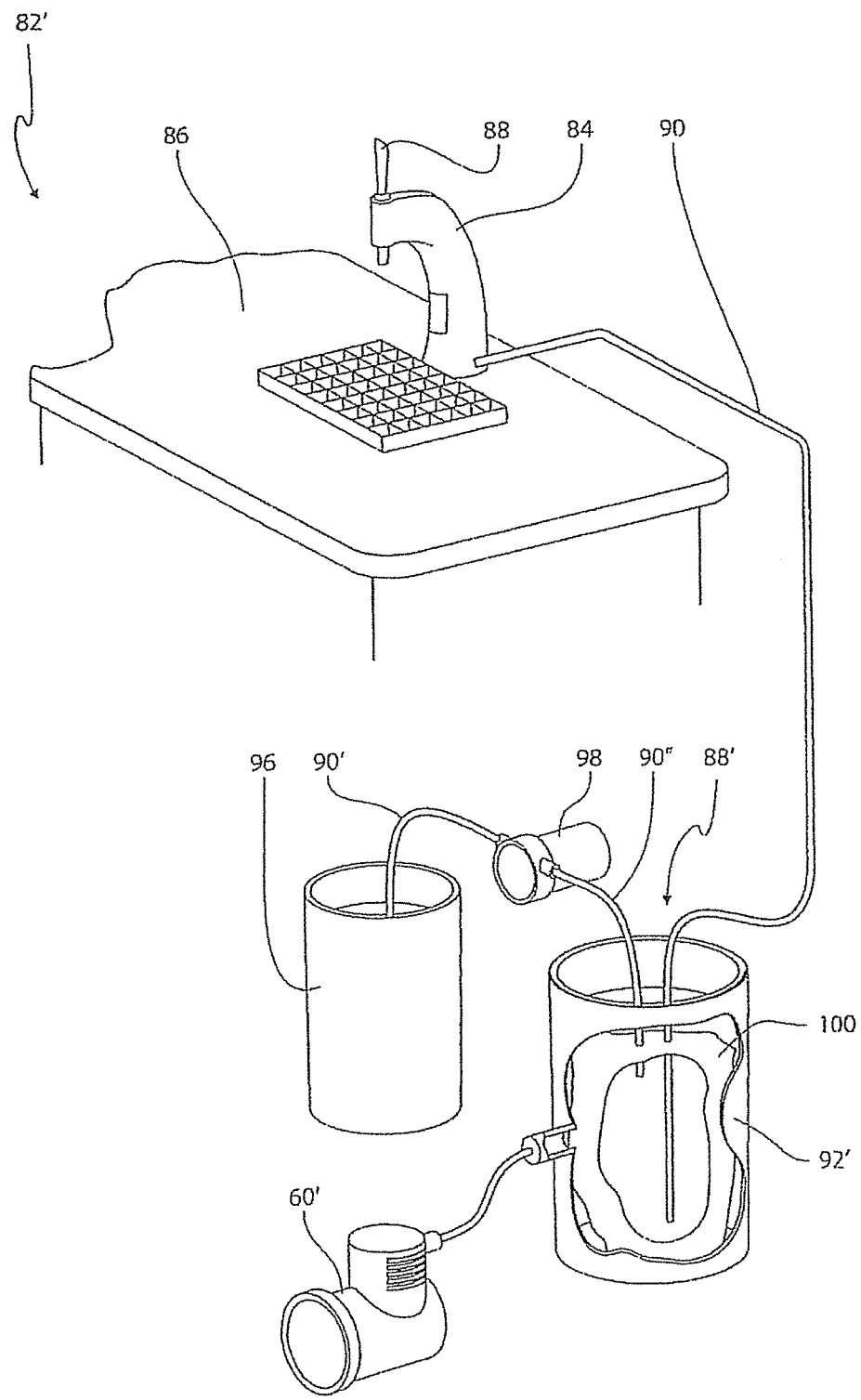
FIG. 14 illustrates a further beverage dispensing system for dispensing beverage according to the present invention.

FIG. 14 shows a beverage dispensing system 82' similar to the beverage dispensing system 82 of the previous embodiment, however, differing in the layout of the treatment assembly. The treatment assembly 88' of the beverage dispensing system 82' includes a vessel 92'. The vessel 92' includes a flexible bag 100, which is connected to the tapping line 90. The flexible bag 100 is supplied with beverage from a steel keg 96 by a pump 98. The vessel 92 may be pressurized to pressure of at least 1 bar above the equilibrium pressure of the carbonated beverage in the steel keg 96 by an air compressor 60'. The beverage may thus be filled into the flexible bag 100 for treatment over an extended time period, e.g. from some minutes to several days, to a pressure sufficient for generating ultra fine bubbles within the beverage.

Figure 15:
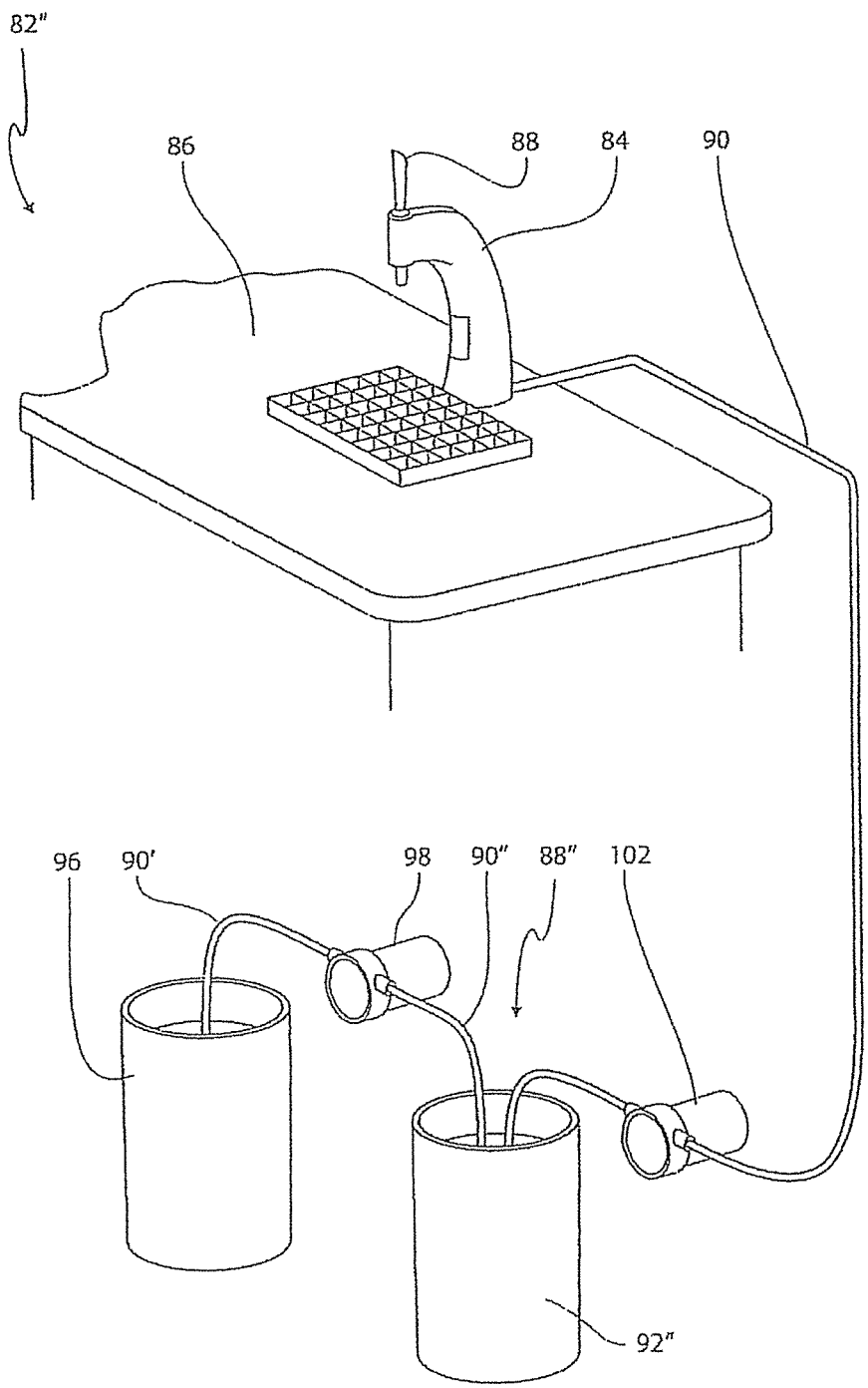
FIG. 15 illustrates yet a further beverage dispensing system for dispensing beverage according to the present invention.

FIG. 15 shows a beverage dispensing system 82" similar to the beverage dispensing system 82' of the previous embodiment, however, differing in the layout of the treatment assembly. The treatment assembly 88" of the beverage dispensing system 82" includes a vessel 92". The vessel 92" is connected to the tapping line 90. The vessel 92" is supplied with beverage from a steel keg 96 by a pump 98. The vessel 92" may be pressure filled with beverage to pressure of at least 1 bar above the equilibrium pressure of the carbonated beverage in the steel keg 96 by use of the pump 98. The beverage should preferably be transferred completely from the steel keg 96 into the vessel 92" for treatment over an extended time period, e.g. from some minutes to several days, to a pressure sufficient for generating ultra fine bubbles within the beverage. When the beverage has been treated, the beverage may be supplied to the tapping column 84 via a dispensing pump 102 operated via the handle 88.

Figure 16:
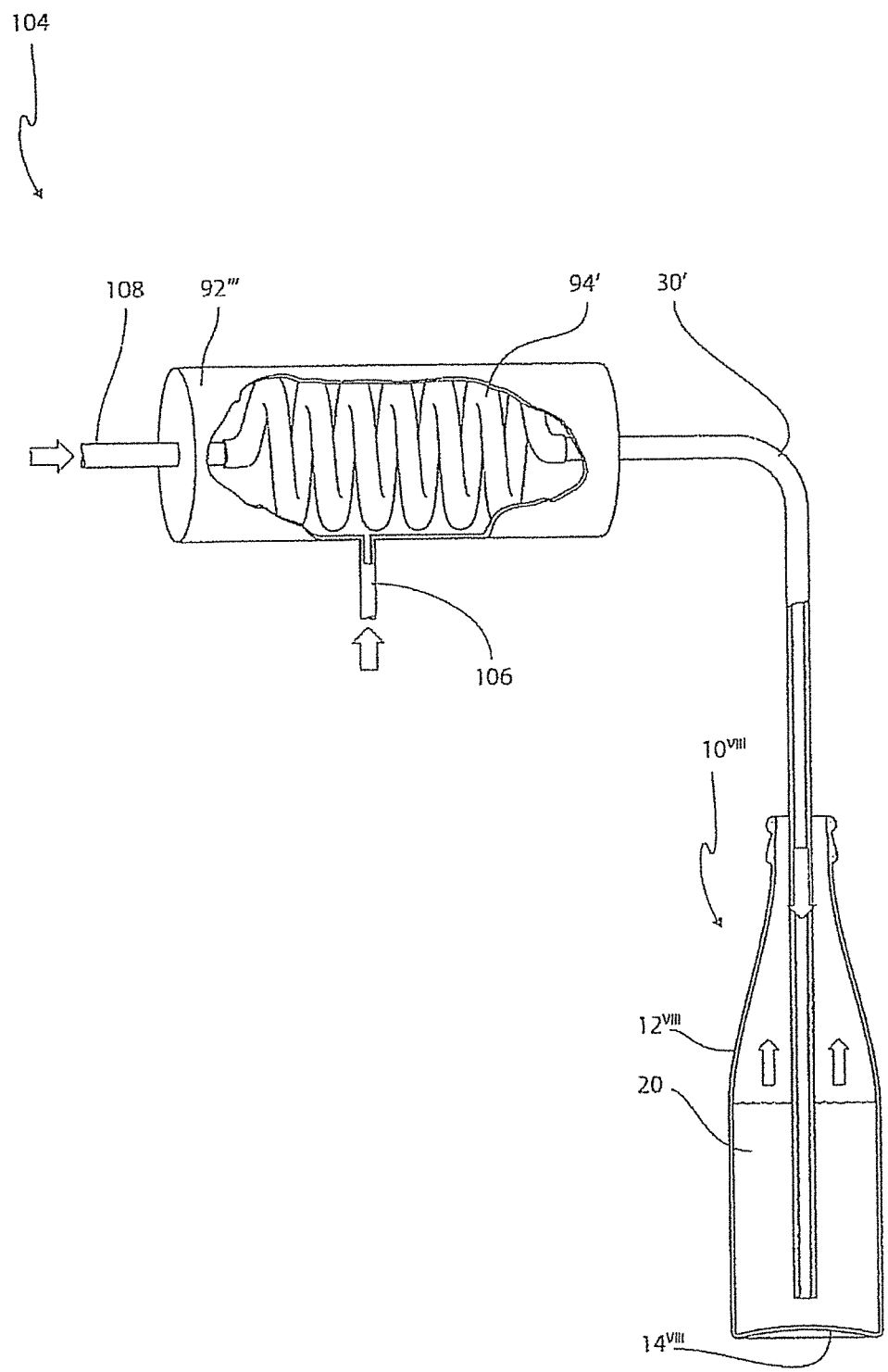
FIG. 16 illustrates a beverage production plant for producing beverage according to the present invention.

FIG. 16 shows a beverage production plant 104 comprising a vessel 92", a beverage inlet 108, a filling pipe 30' and a flexible line part 94' extending within the vessel 92'" between the beverage inlet 108 and the filling pipe 30'. The beverage inlet is connected directly to the output line of a production facility (not shown), in which a beverage having dissolved and partially dissociated carbon dioxide present in an amount of 2-10 g/liter and establishing an equilibrium pressure at 10° C. of 0.5-3 bar is produced. The beverage further includes a water insoluble or hydrophobic constituent present in molecular form or in molecular aggregated form. The vessel 92'" further includes a pressure inlet for introducing a pressure of at least 1 bar above the equilibrium pressure of the carbonated beverage within the vessel 92'" for continuously generating ultra fine bubbles including gaseous carbon dioxide. The filling pipe 30' is part of a filling assembly in which continuous beverage containers $10^{VIII}$ are filled with beverage. Experiments have shown that the ultra fine bubbles may remain within a capped beverage container at equilibrium pressure for at least one month.

Figure 17:
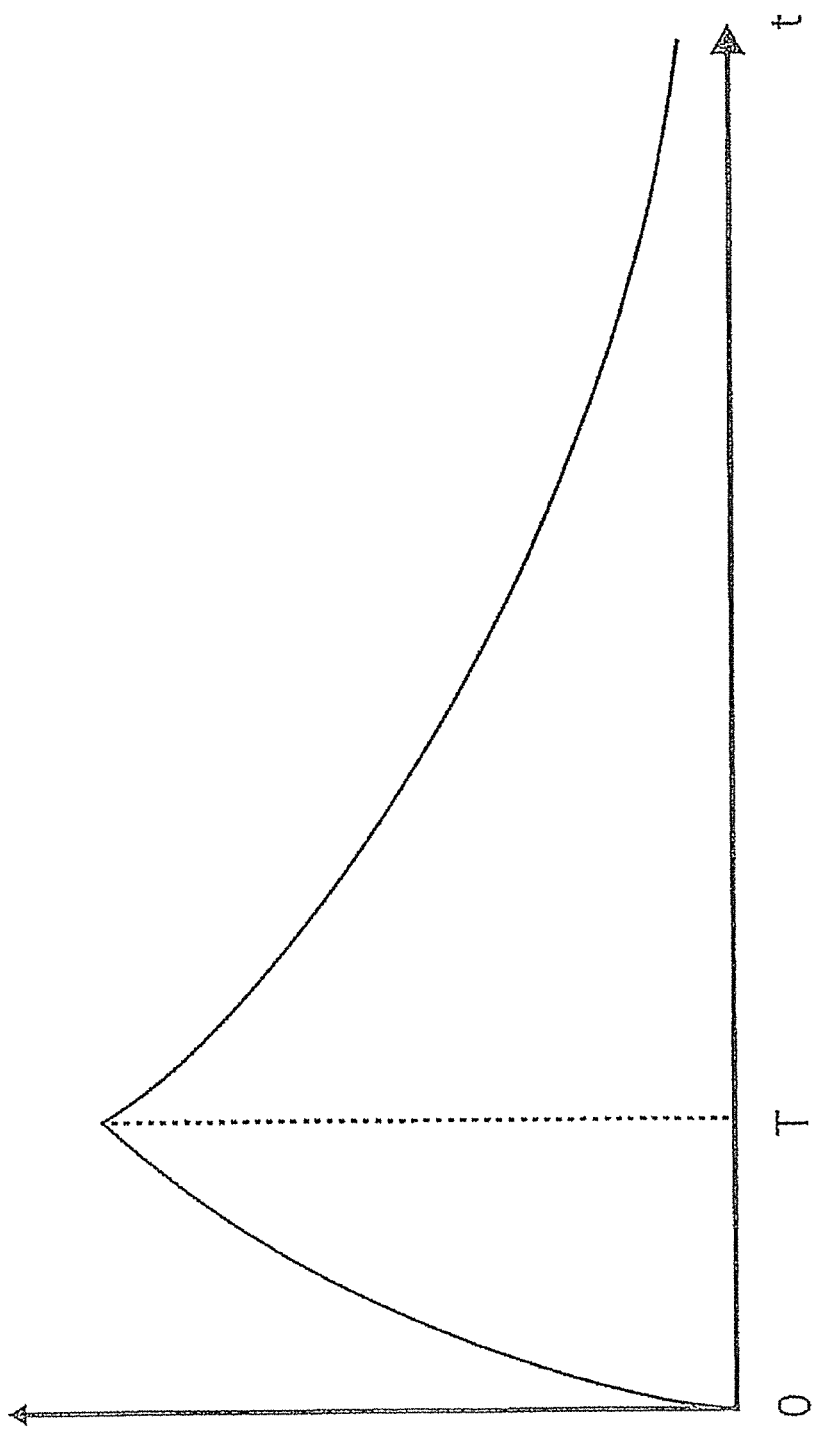
FIG. 17 illustrates an empirically derived curve describing the ultra fine bubble generation and collapse over time.

FIG. 17 shows an experimentally verified curve describing the ultra fine bubble generation and collapse over time. It is thereby shown that the generation of ultra fine bubbles when the beverage is subjected to an external isostatic pressure of 1 bar above the equilibrium pressure of the beverage defines a growth towards an equilibrium value (from time 0 to T in the plot), while the collapsing of the ultra fine bubbles when the beverage is subjected to a pressure equal to the pressure equilibrium of the beverage defines an exponential decay of about the second order (from T to t). It has been experimentally verified that the half life of the ultra fine bubbles is about one month at equilibrium pressure.

LIST OF PARTS WITH REFERENCE TO THE FIGURES

10. Beverage container
12. Wall
14. Bottom
16. Cap
18. Pouch
20. Beverage
22. Bars
24. Strap
26. Clamping mechanism
28. Outer container
30. Filling pipe
32. Expanding agents
34. Pasteurization plant
36. Pressurization device
38. First reactant
40. Second reactant
42. Rupturable membrane
44. Piercing device
46. Mouth
48. Tab
50. Multipack
52. Spacer
54. Refrigerator
56. Door
58. Inner space
60. Air Compressor
62. Cooling device
64. Lock
66. "Open" button
68. "Close" button
70. Lid
72. Seal
74. Gap
76. Bore
78. Pressure chamber
80. Cover
82. Beverage dispensing system
84. Tap column

LIST OF PARTS WITH REFERENCE TO THE FIGURES

86. Bar counter
88. Handle
90. Tapping line
92. Vessel
94. Flexible line part
96. Steel keg
98. Pump
100. Flexible bag
102. Dispensing pump
104. Beverage production plant
106. Pressure inlet
108. Beverage inlet

The invention claimed is:

1. A beverage, comprising:
dissolved and partially dissociated carbon dioxide present in an amount of 2-10 g/liter, and establishing an equilibrium pressure at 10° C. of 2.0-3.0 bar above atmospheric pressure; and
a water insoluble or hydrophobic constituent present in molecular form or in molecular aggregated form and in an amount capable of generating ultrafine gaseous bubbles of carbon dioxide in response to the exposure of the beverage to an external isostatic pressure exceeding the equilibrium pressure of the beverage by at least 1.0 bar, the ultrafine gaseous bubbles being present in an amount exceeding $10^{10}$ ultrafine bubbles per milliliter, the ultrafine gaseous bubbles having a major dimension smaller than 100 nm.

2. The beverage according to claim 1, wherein the water insoluble or hydrophobic constituent comprises at least one substance selected from the group consisting of oily substances, fatty acids, and proteins.

3. The beverage according to claim 1, wherein the beverage has a compressibility in the range between $10^{-4}$ bar$^{-1}$ and $10^{-2}$ bar$^{-1}$.

4. A beverage container containing a beverage, wherein the beverage container has an internal volume that defines a beverage space and a head space, the head space being no more than 5.0% of the internal volume of the beverage container, and wherein the beverage comprises:
dissolved and partially dissociated carbon dioxide present in an amount of 2-10 g/liter, and establishing an equilibrium pressure at 10° C. of 2.0-3.0 bar above atmospheric pressure; and
a water insoluble or hydrophobic constituent present in molecular form or in molecular aggregated form and in an amount capable of generating ultrafine gaseous bubbles of carbon dioxide in an amount exceeding $10^{10}$ ultrafine gaseous bubbles per milliliter when the beverage is exposed to an external isostatic pressure exceeding the equilibrium pressure of the beverage by at least 1.0 bar, the ultrafine gaseous bubbles having a major dimension smaller than 100 nm.

5. The beverage container according to claim 4, wherein the beverage container is configured to expose the beverage to an external isostatic pressure exceeding the equilibrium pressure of said beverage by at least 1.2 bar.

6. The beverage container according to claim 5, wherein the beverage container is made of a flexible material and the external isostatic pressure is applied outside the beverage container.

7. The beverage container according to claim 6, wherein the beverage container defines a radial dimension and an axial dimension, and wherein the external isostatic pressure is applied as a pressure force in at least one of the radial dimension and the axial dimension.

8. The beverage container according to claim 5, wherein the external isostatic pressure is applied as a mechanical pressure within the beverage container.

9. The beverage container according to claim 5, wherein the beverage container includes a lid configured to subject the beverage to the isostatic pressure.

10. The beverage container according to claim 9, wherein the lid includes a flexible pouch containing an expanding agent for producing the isostatic pressure.

11. A container assembly, comprising:
a beverage container containing a beverage, wherein the beverage container has an internal volume that defines a beverage space and a head space, the head space being no more than 5.0% of the internal volume of the beverage container, and wherein the beverage comprises:
dissolved and partially dissociated carbon dioxide present in an amount of 2-10 g/liter, and establishing an equilibrium pressure at 10° C. of 2.0-3.0 bar above atmospheric pressure; and
a water insoluble or hydrophobic constituent present in molecular form or in molecular aggregated form and in an amount capable of generating ultrafine gaseous bubbles of carbon dioxide in an amount exceeding $10^{10}$ ultrafine bubbles per milliliter when the beverage is exposed to an external isostatic pressure exceeding the equilibrium pressure of the beverage by at least 1.0 bar, the ultrafine gaseous bubbles having a major dimension smaller than 100 nm, wherein the beverage container is configured to expose the beverage to an external isostatic pressure exceeding the equilibrium pressure of the beverage by at least 1.2 bar, wherein the beverage container is made of a flexible material and the external isostatic pressure is applied outside the beverage container; and
an outer container completely encapsulating the beverage container and defining a space between the beverage container and the outer container, the space being filled by a gas that subjects the beverage container to the external isostatic pressure.

12. A method of improving the taste of a beverage, said method comprising:
(a) providing a beverage including:
(i) dissolved and partially dissociated carbon dioxide present in an amount of 2-10 g/liter, and establishing an equilibrium pressure at 10° C. of 2.0-3.0 bar above atmospheric pressure; and
(ii) a water insoluble or hydrophobic constituent present in molecular form or in molecular aggregated form and in an amount capable of generating ultrafine gaseous bubbles of carbon dioxide in an amount exceeding $10^{10}$ ultrafine bubbles per milliliter when the beverage is exposed to an external isostatic pressure exceeding the equilibrium pressure of the beverage by at least 1.0 bar, the ultrafine gaseous bubbles having a major dimension smaller than 100 nm; and
(b) subjecting the beverage to an external isostatic pressure exceeding the equilibrium pressure of the beverage by at least 1.0 bar.

* * * * *